(12) United States Patent
Paradies

(10) Patent No.: US 6,735,597 B1
(45) Date of Patent: May 11, 2004

(54) INCIDENT ANALYSIS AND SOLUTION SYSTEM

(76) Inventor: Mark W. Paradies, 10608 Kincer Farms Dr., Knoxville, TN (US) 37922

( * ) Notice: Subject to any disclaimer, the term of this patent is extended or adjusted under 35 U.S.C. 154(b) by 38 days.

(21) Appl. No.: 10/122,888

(22) Filed: Apr. 15, 2002

Related U.S. Application Data

(63) Continuation of application No. 09/416,698, filed on Oct. 12, 1999.

(51) Int. Cl.[7] ............................................. G06F 17/30
(52) U.S. Cl. ........................ 707/102; 707/100; 707/104
(58) Field of Search ................................. 707/102, 104, 707/100; 700/79; 714/4, 26, 25–27, 57, 47, 46; 345/173, 473, 791

(56) References Cited

U.S. PATENT DOCUMENTS

| 5,726,884 A | 3/1998 | Sturgeon et al. |
| 5,790,780 A | 8/1998 | Brichta et al. |

OTHER PUBLICATIONS

Proact brochure, Reliability Center, Inc.

*Primary Examiner*—Shahid Alam
*Assistant Examiner*—Cam-Y Truong
(74) *Attorney, Agent, or Firm*—Luedeka, Neely & Graham, P.C.

(57) ABSTRACT

A computer-implemented system determines, by logical progression through multiple analysis levels, a human factor that represents a root cause of a particular incident. The system begins at a broad analysis level and progresses through more narrow analysis levels to a root cause level. Each analysis level includes multiple causal factor categories, with each causal factor category branching into causal factor subcategories that reside on a more narrow analysis level. The system includes an information input device for inputting incident information relating to the particular incident. The system also includes a memory device for storing a causal information database that provides a relationship between the multiple analysis levels and causal factor categories and between causal factor categories and root causes. The causal information database also relates root causes to corrective actions that may be implemented to prevent future occurrences of the incidents.

10 Claims, 35 Drawing Sheets

TapRooT® Corrective Actions Report

Incident Number: 98-195E    Incident Title: Temp Water Treatment Unit Fish Kill

|   | | | Due | |
|---|---|---|---|---|
| Causal Factor | Root Cause | Corrective Action | Complete | Responsibility |
| 01 Contract Operator Falls Asleep | Human Performance Difficulty (1H) Procedures (3P) | | / / | See other corrective actions |
| 01 Contract Operator Falls Asleep | Human Performance Difficulty (1H) Management System (3M) Standards, Policies, or Admin. Controls Not Used (4SN) No way to implement (5NW) | 10 Implement new monitoring, overtime, and supervisory requirements so that the odds of sleeping on the job are greatly reduced. (See corrective actions 1-9.) | / / | See other corrective actions |
| 01 Contract Operator Falls Asleep | Human Performance Difficulty (1H) Management System (3M) Standards, Policies, or Admin. Controls Not Used (4SN) No way to implement (5NW) | 11 Create guidance for operators, mechanics, and contract personnel for actions they are to take if they feel excessively drowsy or in any way feel unfit to perform the job that they have been assigned. | 8/30/98 / / | Human Resources Simon, Andy |
| 01 Contract Operator Falls Asleep | Human Performance Difficulty (1H) Management System (3M) Standards, Policies, or Admin. Controls Not Used (4SN) No way to implement (5NW) | 12 Create and provide training for all operators, mechanic, and supervisors on the actions they are to take if they feel excessively drowsy or in any way feel unfit to perform the job that they have been assigned. | 12/30/98 / / | Training Doe, John |
| 01 Contract Operator Falls Asleep | Human Performance Difficulty (1H) Management System (3M) Standards, Policies, or Admin. Controls Not Used (4SN) No way to implement (5NW) | 13 Create and provide a training module for all contractors who supply contract operators or contract mechanics on the actions they are to take if they feel excessively drowsy or in any way feel unfit to perform the job that they have been assigned. | 1/15/99 / / | Training Doe, John |
| 01 Contract Operator Falls Asleep | Human Performance Difficulty (1H) Management System (3M) Standards, Policies, or Admin. Controls Not Used (4SN) No way to implement (5NW) | 14 Provide the training module developed in corrective action 13 to all contractors who supply contract operators or contract mechanics as a good practice. Negotiate adoption of this good practice in all future contracts for contract operators or mechanics. | 1/30/99 / / | Contracts Gunder, Frand |
| 01 Contract Operator Falls Asleep | Human Performance Difficulty (1H) Human Engineering (3H) Human-Machine Interface (4HM) Monitoring alertness NI (5ME) | 01 Move diesel driven compressor away from temp. water treatment unit so that alarm on unit can be heard (see corrective action in causal factor 3). | 6/ 5/98 6/ 5/98 | Operations Wilson, Tom |

Printed on 2/ 9/99 by TapRooT® software for System Improvements, Inc.    Page 1

Fig. 42

TapRooT® Corrective Actions Status Tracking Report

| Incident | Corrective Action | Corrective Action Status | Due | Complete |
|---|---|---|---|---|
| Responsible Department: Contractor | | Responsible Person: Smith, Henry | | |
| 98-195E Temp Water Treatment Unit Fish Kill | 23 Install new detector per corrective action 24. | | 6/5/98 | 6/9/98 |
| 98-195E Temp Water Treatment Unit Fish Kill | 24 Replace the detector with the new model available from the manufacturer. | | 6/5/98 | 6/9/98 |
| Responsible Department: Contracts | | Responsible Person: Gunder, Fraud | | |
| 98-195E Temp Water Treatment Unit Fish Kill | 02 Require that the contractor provide additional contract operator coverage to provide at a minimum four contract operators so that overtime is reduced and so that no operator monitors the temporary water treatment unit for more than 8 hours. | Contractor notified and new contract operators were in place by 6/25/98. | 6/15/98 | 6/15/98 |
| 98-195E Temp Water Treatment Unit Fish Kill | 04 Require that the contractor provide additional contract operator coverage to provide at a minimum four contract operators so that overtime is reduced and so that no operator monitors the temporary water treatment unit for more than 8 hours. (Same as corrective actions under Human Engineering cause.) | Contractor notified and new contract operators were in place by 6/25/98. | 6/15/98 | 6/15/98 |
| 98-195E Temp Water Treatment Unit Fish Kill | 09 Provide supervisory training module to contractors as a good practice. Allow contractor training rep to attend in-house company presentation. Require some type of supervisory training on the minimum supervisory requirements in all future contracts that include contract operations or maintenance personnel. | Module development and schedule of in-house training not yet available. Will complete when module and course is available. | 10/1/98 | |
| 98-195E Temp Water Treatment Unit Fish Kill | 14 Provide the training module developed in corrective action 13 to all contractors who supply contract operators or contract mechanics as a good practice. Negotiate adoption of this good practice in all future contracts for contract operators or mechanics. | Awaiting completion of corrective action 13. | 1/30/99 | |

Printed on 2/9/99 by TapRooT® software for System Improvements, Inc.

Page 1

Fig. 44

TapRooT® Incident Report

Incident: 98-195E
Temp Water Treatment Unit Fish Kill

| | | |
|---|---|---|
| Date and Time of Incident: | 6/ 1/98 | 5:00 am |
| Date and Time Investigation Started: | 6/ 1/88 | 9:00 am |
| Date Draft Report Sent for Approval: | 6/22/98 | |
| Date Final Report Issued: | 7/ 1/98 | |

Incident Classification: Incident

Facility Affected: Chemical Plant 1
Area Affected: Manufacturing

Incident Cost: $ 256,953
Lost Production: 27 hours

Notifications:
State Dept of Helath & Environmental Control
Exceedance Report

Incident Summary:
Outfall temperature & pH exceeded permit limits after cooling water was lost to a temporary waste water treatment unit.

Initial Conditions:
Plant in operation at steady state.

Initiating Event:
Cooling water hose ruptured.

Incident Description:
On June 1, 1998 ay about 4:20 a.m., a cooling water hose on a temporary water treatment unit ruptured. Failure of the hose caused a loss of cooling water to the unit which should have been immediately secured. However the contract operator had fallen asleep and the automatic shutdown features had been bypassed by the contractor (who owned the equipment).

The continued operation of the unit without cooling water caused the unit's resin to overheat and degrade. Therefore the failure of the cooling water hose plus the failure to secure the unit allowed high temperature and low pH water (estimated to be 200 degrees Fahrenheit and pH 3) to enter the plants outfall and cause about 100 fish to be killed in the downstream section of the river at the plant boundary.

About 40 minutes after the hose ruptured, plant personnel looking into a report of water on a roadway adjacent to the manufacturing building found the ruptured hose and the sleeping operator and had the operator secure the temporary water treatment unit, thus stopping the release of the high temperature, low pH water.

All fish were collected and disposed of. No long term environmental damage is expected as a result of the temporary outfall exceedance.

Immediate Corrective Actions:
About 40 minutes after the hose ruptured, plant personnel looking into a report of water on a roadway adjacent to the manufacturing building found the ruptured hose and the sleeping operator and had the operator secure the temporary water treatment unit, thus stopping the release of the high temperature, low pH water.

All fish were collected and disposed of. No long term environmental damage is expected as a result of the temporary outfall exceedance.

Printed on 2/ 9/99 by TapRooT® software for System Improvements, Inc.  Page 1

Fig. 46

TapRooT® Incident Report

Causal Factor: 01
Contract Operator Falls Asleep

The Contract Operator fell asleep sometime after taking his 4 a.m. logs.

He was on his 5th week of 12 hour shifts. He would typically work 8 straight days of 12 hours on / 12 hours off followed by 4 off days before returning for another 8 straight days of 12 hours on / 12 hours off. His shift started at 6 p.m. and ended at 6 a.m. By this rotation he always worked the night shift.

He was on his second day of 12 hour night shift duty when the incident occurred. He admitted to being awake all day the day before his first 12 hour shift and not sleeping well before his second night shift. He says that he only received about 4 hours of sleep before starting work on the night of the incident (4 hours of sleep in the prior 44 hours).

He did not see his supervisor before starting work. His supervisor works days and seldom sees night personnel unless there is a problem.

Root Cause: Human Performance Difficulty (1H)
    Procedures (3P)

*No Corrective Actions are assigned for this Root Cause*

Root Cause: Human Performance Difficulty (1H)
    Management System (3M)
        Standards, Policies, or Admin. Controls Not Used (4SN)
            No way to implement (5NW)

Due to excessive overtime, team decided that there was no way that the contract operator could avoid the possibility of falling asleep in a boring job, isolated from stimuli on a 12 hour night shift. Therefore, the team decided that the policy of sleeping not being allowed was equivalent to a policy of breathing not being allowed (as given the circumstances, one would expect extreme fatigue).

Therefore, given the circumstance, the team decided that there was no way to implement the no sleeping policy

Corrective Action: 10
    Date Due:     Responsible Dept.: See other corrective actions
    Date Complete:     Responsible Person: See other corrective actions
Implement new monitoring, overtime, and supervisory requirements so that the odds of sleeping on the job are greatly reduced. (See corrective actions 1-9.)

Corrective Action: 11
    Date Due: 8/30/98     Responsible Dept.: Human Resources
    Date Complete:     Responsible Person: Simon, Andy
Create guidance for operators, mechanics, and contract personnel for actions they are to take if they feel excessively drowsy or in any way feel unfit to perform the job that they have been assigned.

Corrective Action: 12
    Date Due: 12/30/98     Responsible Dept.: Training
    Date Complete:     Responsible Person: Doe, John
Create and provide training for all operators, mechanic, and supervisors on the actions they are to take if they feel excessively drowsy or in any way feel unfit to perform the job that they have been assigned.

Printed on 2/ 9/99 by TapRooT® software for System Improvements, Inc.

Fig. 47

TapRooT® Root Cause Tree™ Comment Report

Incident: 98-195E
Temp Water Treatment Unit Fish Kill

Outfall temperature & pH exceeded permit limits after cooling water was lost to a temporary waste water treatment unit.

Causal Factor: 01
Contract Operator Falls Asleep

The Contract Operator fell asleep sometime after taking his 4 a.m. logs.

He was on his 5th week of 12 hour shifts. He would typically work 8 straight days of 12 hours on / 12 hours off followed by 4 off days before returning for another 8 straight days of 12 hours on / 12 hours off. His shift started at 6 p.m. and ended at 6 a.m. By this rotation he always worked the night shift.

He was on his second day of 12 hour night shift duty when the incident occurred. He admitted to being awake all day the day before his first 12 hour shift and not sleeping well before his second night shift. He says that he only received about 4 hours of sleep before starting work on the night of the incident (4 hours of sleep in the prior 44 hours).

He did not see his supervisor before starting work. His supervisor works days and seldom sees night personnel unless there is a problem.

Root Cause: Human Performance Difficulty (1H)
Procedures (3P)

*No comment has been entered for this Root Cause*

Root Cause: Human Performance Difficulty (1H)
Management System (3M)
Standards, Policies, or Admin. Controls Not Used (4SN)
No way to implement (5NW)

Due to excessive overtime, team decided that there was no way that the contract operator could avoid the possibility of falling asleep in a boring job, isolated from stimuli on a 12 hour night shift. Therefore, the team decided that the policy of sleeping not being allowed was equivalent to a policy of breathing not being allowed (as given the circumstances, one would expect extreme fatigue).

Therefore, given the circumstance, the team decided that there was no way to implement the no sleeping policy.

Root Cause: Human Performance Difficulty (1H)
Management System (3M)
Oversight / Employee Relations (4OE)

*This has not been assigned as a Root Cause for this Causal Factor*

Considered having a cause under Oversight/Employee Relations - infrequent audits & evaluations because the problem of working long hours and not being alert (not asleep) on the night shift was not detected by an audit. Decided that anyone could have realized this without an audit so that auditing was not necessary to detect this problem.

Fig. 49

INCIDENT ANALYSIS AND SOLUTION SYSTEM

This application is a continuation of application Ser. No. 09/416,698 filed Oct. 12, 1999.

TECHNICAL FIELD

The present invention is generally directed to a system for investigating and reducing the occurrence of undesirable incidents, such as industrial accidents. More specifically, the invention is directed to a system for identifying a human action, or lack of action, that represents an underlying cause of an incident, and suggesting corrective action to reduce the probability of a future occurrence of a similar incident. This specification includes a source code microfiche appendix comprising eight slides with a total of 684 frames.

BACKGROUND OF THE INVENTION

Considerable monetary and other losses occur due to various unanticipated and unwanted incidents caused by things such as employee action or inaction. For example, industrial incidents cause millions of dollars in lost profits annually. Transportation incidents, including rail, air, and shipping incidents, result not only in lost revenue, but also loss of life and environmental damage. Fortunately, most of these incidents can be prevented if business managers understand and eliminate the underlying causes of such incidents.

Consistently, it has been determined that human action, or lack of action, is the underlying cause of a great number of these incidents. Even when an equipment malfunction is a contributing factor in causing an incident, often the equipment malfunctioned due to human oversight. Such human oversight includes design flaws, manufacturing errors, lack of proper maintenance, or incorrect operation of the equipment.

Identifying underlying causes provides for the development of effective corrective actions for the real problems that cause, or significantly contribute to, incidents. Implementation of effective corrective action is the preferred means to achieve dramatic, lasting reductions in the numbers of repeat incidents. Thus, to prevent the occurrence of a costly incident, the underlying cause of the incident should first be identified, and then a specific corrective action is implemented directed to eliminating the specific underlying cause.

Therefore, a system is needed that guides a business manager to an underlying cause of an incident, and that suggests corrective actions that may be implemented to eliminate the underlying cause.

SUMMARY OF THE INVENTION

The foregoing and other needs are met by a computer-implemented system for determining, by logical progression through multiple analysis levels, a human factor that represents a root cause of a particular incident. The system begins at a broad analysis level and progresses through more narrow analysis levels to a root cause level. Each analysis level includes multiple causal factor categories, with each causal factor category branching into causal factor subcategories that reside on a more narrow analysis level.

The system includes an information input device for inputting incident information relating to the particular incident and for converting the incident information into a system-compatible format. The system also includes a memory device for storing a causal information database that provides a relationship between the multiple analysis levels and causal factor categories and between causal factor categories and root causes. The causal information database stored in the memory device also relates root causes to corrective actions that may be implemented to prevent future occurrences of the incidents. A processor, which is connected to the information input device and to the memory device, accesses the causal information database and determines a human factor that represents a root cause of the particular incident. This determination is made by logical progression through the multiple analysis levels based upon the incident information from the information input device. The processor logically progresses through the multiple analysis levels by selecting, based upon the incident information, an appropriate causal factor category at each analysis level. The processor accesses the causal information database and determines at least one corrective action that may be implemented to prevent future occurrences of the particular incident based on the root cause of the particular incident. The system further includes a display device connected to the processor for displaying a graphic representation of the multiple analysis levels. The graphic representation indicates the causal factor categories selected by the processor in determining the root cause of the particular incident. The display device also displays the corrective actions that may be implemented to prevent future occurrences of the particular incident.

Thus, the present invention provides a user with a powerful tool for identifying root causes of incidents and determining correction actions to prevent a recurrence of the incidents. The invention provides links between causes and suggested corrective actions at the root cause level, not at higher levels in the causal database structure. Corrective actions designed to eliminate root causes are more likely to prevent recurrences of an incident than do corrective actions that are based upon less specific information. By providing links between root causes and corrective actions, the invention provides suggestions for the most effective corrective actions.

BRIEF DESCRIPTION OF THE DRAWINGS

Further advantages of the invention will become apparent by reference to the detailed description of preferred embodiments when considered in conjunction with the following drawings, which are not to scale, wherein like reference characters designate like or similar elements throughout the several drawings as follows:

FIGS. 31–35 are illustrations of corrective action summary screens generated by a preferred embodiment of the invention;

FIG. 42 is an illustration of a Corrective Actions Report page generated by a preferred embodiment of the invention;

FIG. 44 is an illustration of a Corrective Actions Status Tracking Report page generated by a preferred embodiment of the invention;

FIGS. 46–47 are illustrations of Incident Report pages generated by a preferred embodiment of the invention;

FIG. 49 is an illustration of a Root Cause Comment Report page generated by a preferred embodiment of the invention;

DETAILED DESCRIPTION OF THE PREFERRED EMBODIMENT

Figure 1:
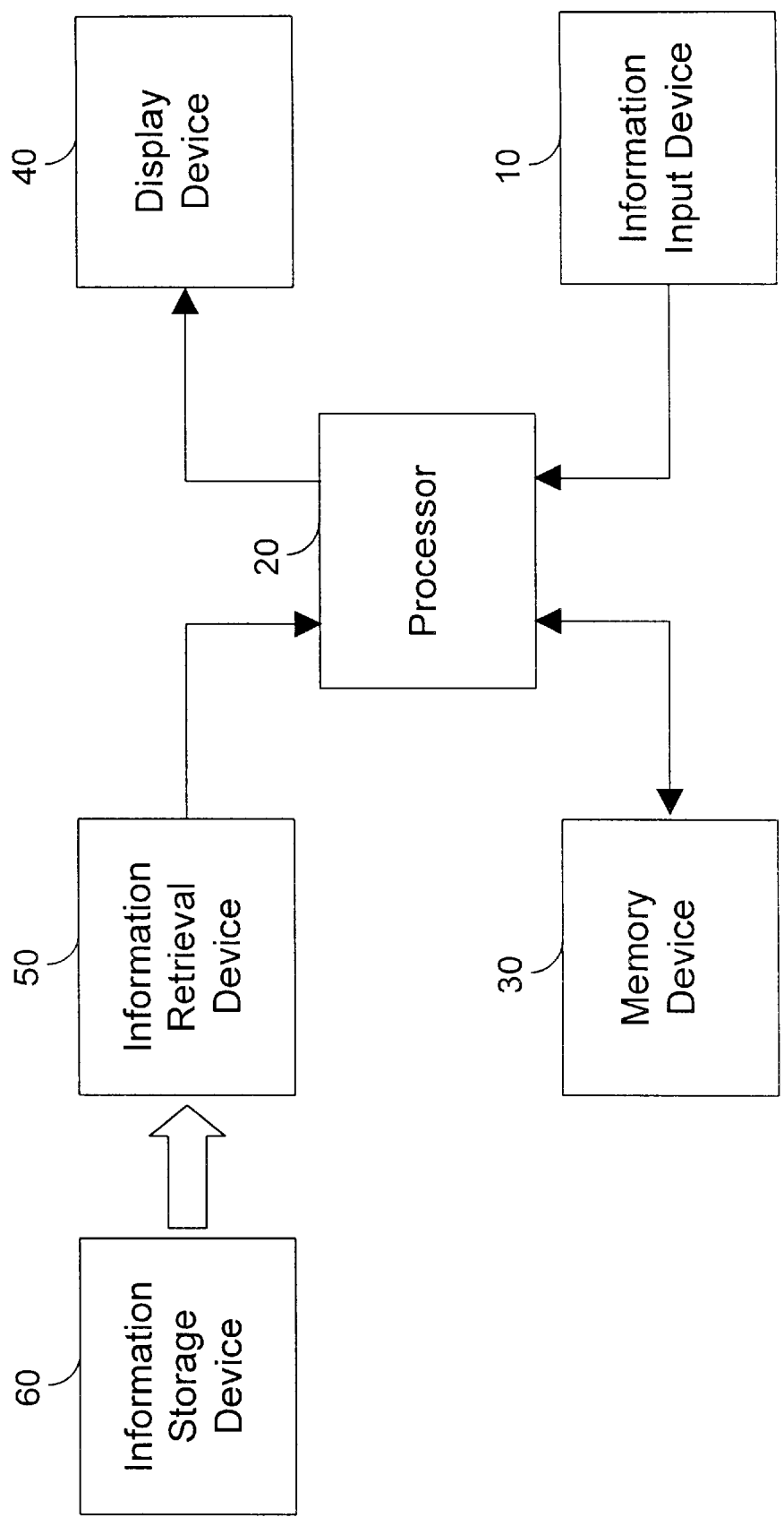
FIG. 1 is a functional block diagram of a computer-implemented system according to a preferred embodiment of the invention.

Shown in FIG. 1 is a preferred embodiment of a computer-implemented expert system for determining a human factor that represents an underlying or root cause of an incident. A brief overview of the system will be presented first, and then a more detailed description follows.

The system includes an information input device 10, such as a computer keyboard or mouse. The input device 10 is connected to a communication port of a processor 20, such as a Pentium™ processor manufactured by Intel Corporation. The processor 30 is connected to a memory device 30, such as a hard disk drive, that stores executable software modules and other information in digital format. A display device 40, such as a computer monitor, is connected to an output port of the processor 20. The display device 40 provides textual and graphical displays that prompt a user for input information, and that provide analysis results to the user. An information retrieval device 50, such as a floppy disk or CD-ROM drive, is connected to an input port of the processor 20. The information retrieval device 50 provides access to digital information from an information storage device 60. The information storage device 60 is a storage medium, such as a floppy disk or CD-ROM, that stores executable software modules, relational databases, and other information that comprise the system software.

Figure 2:
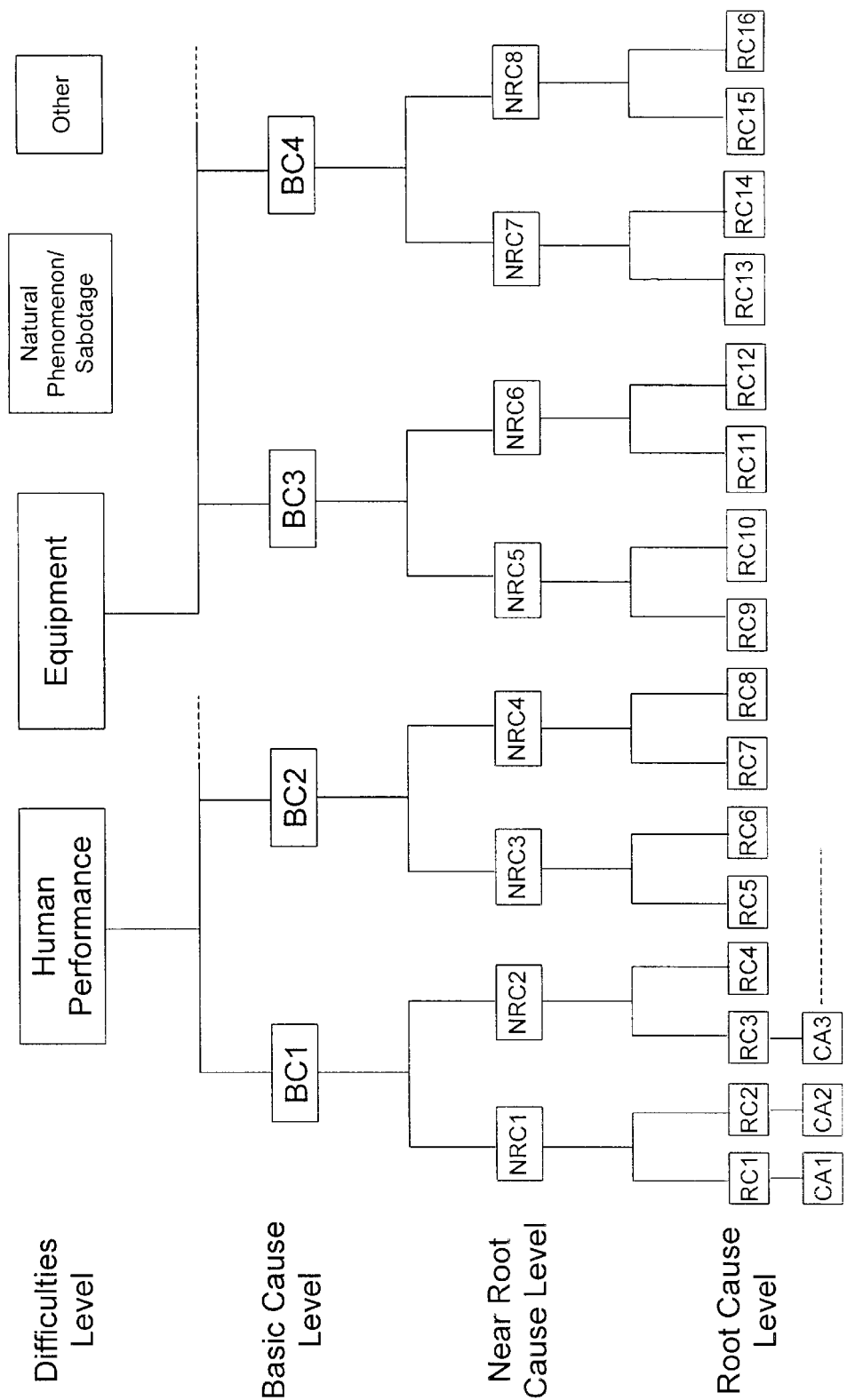
FIG. 2 is a block diagram of a preferred structure of a causal information database generated by the invention.

Shown in FIG. 2 is a preferred structure of a causal information database that resides in the memory device 30 or in the information storage device 60. This database provides a relationship between multiple levels of causal analysis and multiple causal factor categories. As shown in FIG. 2, the top and broadest analysis level is the Difficulties level. Preferably, the Difficulties level includes the following causal categories: human performance, equipment, natural phenomenon/sabotage, and other. Each of the Difficulties level categories branch into basic cause categories that reside on the next lower level: the Basic Cause level. The Basic Cause level categories branch into near root cause categories that reside on the next lower level: the Near Root Cause level. Finally, each of the Near Root Cause level categories branch into root causes that reside on the Root Cause level. Thus, the database progresses from causal categories at the top level having the broadest scope to lower level causal categories having narrower scope.

With continued reference to FIG. 2, the causal information database links each root cause (RC1, RC2, RC3, . . . ) on the Root Cause level to a suggested corrective action. Some root causes are linked to a single corrective action, and some to more than one corrective action. Some root causes are linked to a common corrective action. Preferably, the corrective actions reside in a distinct corrective action database that is related to the causal information database by way of links that associate the two databases. Alternatively, the causal information database and the corrective action database comprise a single database.

The preferred embodiment of the invention provides the various causal categories in the Difficulties, Basic Cause, and Near Root Cause levels. As discussed in more detail below, the invention also preferably provides suggested root causes on the Root Cause level, and suggested corrective actions related to each root cause. Based on the categories, suggested root causes, and suggested corrective actions, it is up to the user to determine the appropriate corrective action to implement. The invention then provides the user with a convenient means for recording the planned corrective action, for associating the planned corrective action with a determined root cause, and for tracking the progress of the implementation of the corrective action.

The structure illustrated in FIG. 2 emphasizes one of the most powerful advantages of the invention: the links between causes and corrective actions occur at the root cause level, not at higher levels in the causal database structure. Corrective actions based on the root causes have a much higher probability of preventing recurrences of an incident than do corrective actions based upon less knowledge, as represented by the higher levels in the database structure. Thus, by providing links between root causes and corrective action, the invention provides suggestions for the most effective corrective action.

Figure 3:
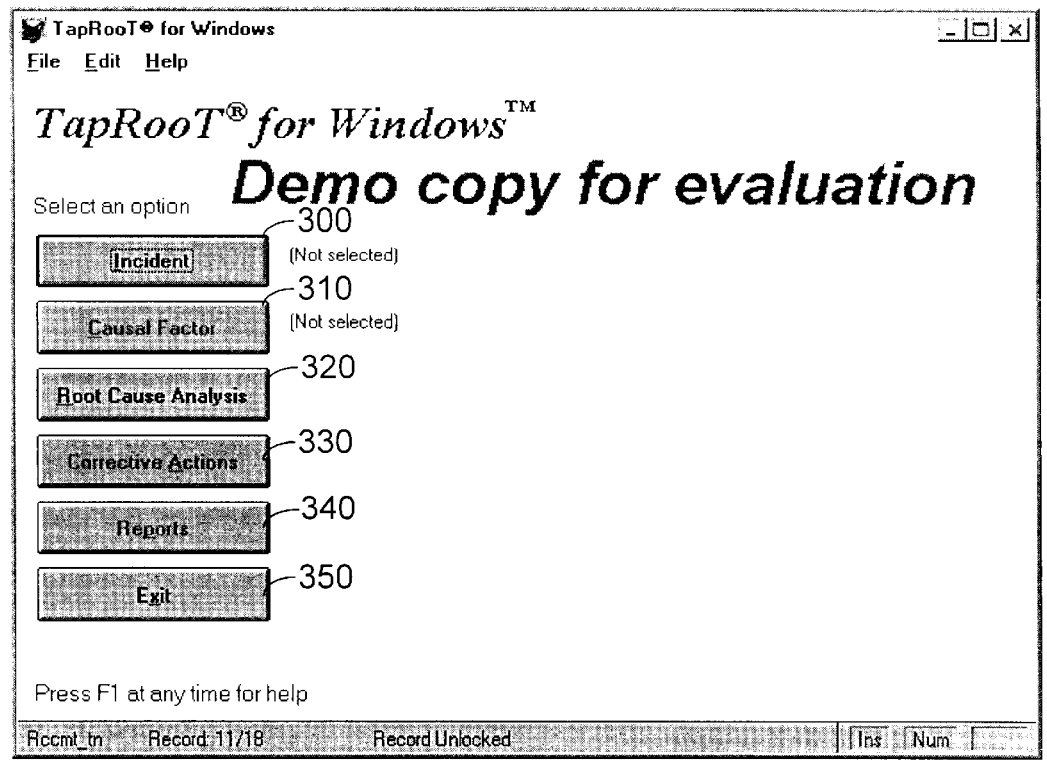
FIG. 3 is an illustration of a main screen generated by a preferred embodiment of the invention.
Figure 60:
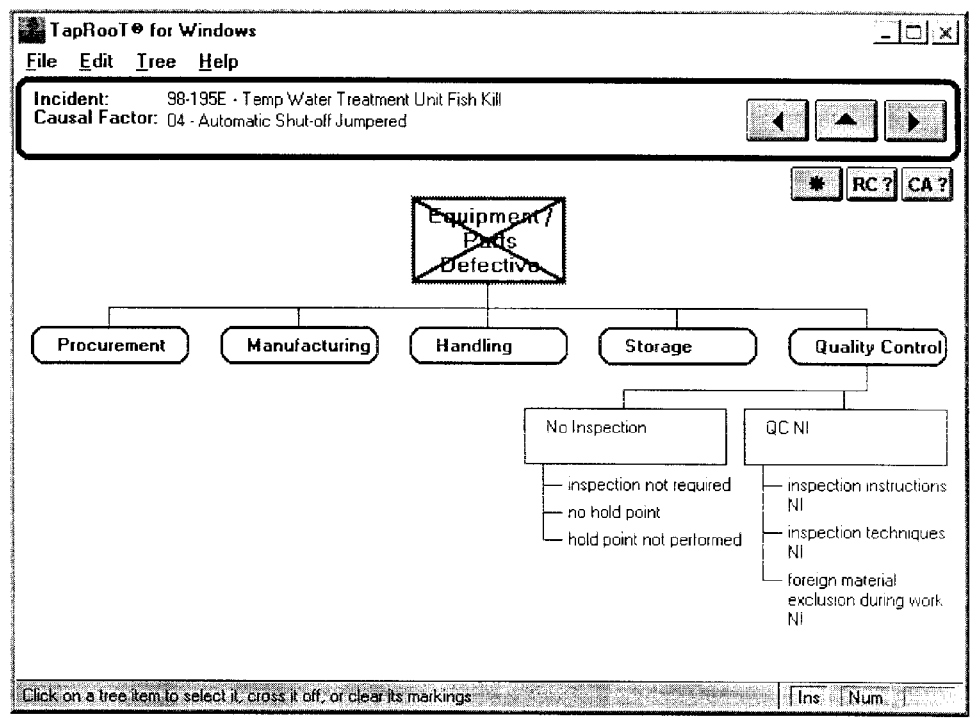
FIG. 60 is an illustration of a screen showing the causal categories under the Equipment/Parts Defective category generated by a preferred embodiment of the invention.

FIGS. 3–60 represent graphic displays (or screen shots) generated by the processor 30 and displayed by the display device 40 during operation of the system. The following discussion of these screens provides a detailed description of the operation of the processor 20 as it executes software instructions to assist a user in analyzing a particular incident. These screens also illustrate a preferred embodiment of the detailed structure of the causal information database stored in the memory device 30 or the information storage device 60. Further, the following discussion of the screens discloses the operational interaction between the processor 20, the input device 10, the display device 40, and the memory device 30 as the system guides a user through an analysis of the particular incident.

Preferably, the system operates under the Microsoft Windows operating system. However, the system is not limited to operation under Windows, and could operate under other operating systems, such as the UNIX system. The screens illustrated in FIGS. 3–60 were generated by the system while running under Windows95.

Shown in FIG. 3 is the main screen generated by the invention when a user starts the system. At this point, the user has the option of selecting a particular incident for analysis, selecting a causal factor associated with the particular incident, performing a root cause analysis for the selected causal factor, viewing corrective actions associated with the selected causal factor, and generating reports of the analysis results. To select a particular incident for analysis, the user activates the Incident button 300 by "pressing" or "clicking" the button 300 using the input device 10.

Figure 4:
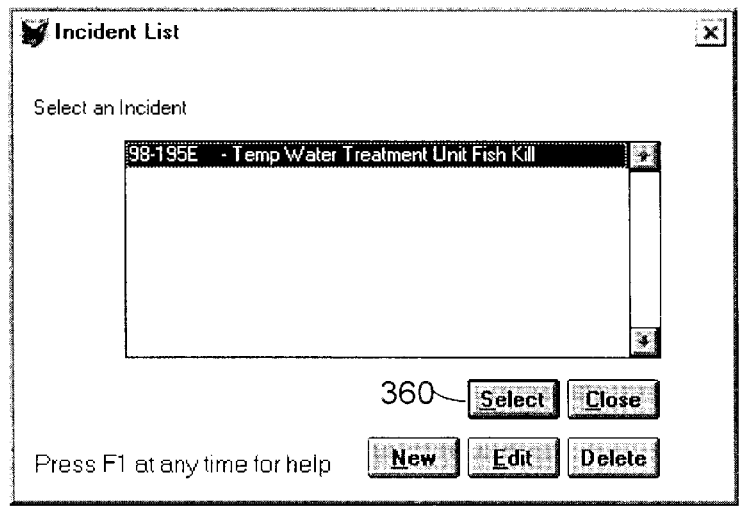
FIG. 4 is an illustration of an Incident List dialog box generated by a preferred embodiment of the invention.

When the processor 20 receives a signal from the input device 10 indicating activation of the Incident button 300, the processor 20 generates the Incident List dialog box shown in the screen of FIG. 4. From the Incident List dialog box, the user may select or edit an existing incident, or create a new incident. To select the existing incident record for analysis, the user clicks on the Select button 360 using the input device 10.

The operation of the invention is described below using an example based on a fictional industrial incident, hereinafter referred to as the "Temp Water Treatment Unit Fish Kill." The incident occurred as follows: On Jun. 1, 1998, at about 4:20 a.m., a cooling water hose ruptured on a temporary water treatment unit at a chemical manufacturing plant. The failure of the hose caused a loss of cooling water to the unit, which should have been immediately secured. However, the contract operator had fallen asleep. Also, the automatic shutdown features had been bypassed by the contractor who owns the equipment. The continued operation of the unit without cooling water caused the unit's resin to overheat and degrade. This allowed high-temperature, low-pH water to enter the plant's outfall, thus causing the death of about 100 fish in the downstream section of the river at the plant boundary.

The contract operator had fallen asleep sometime after filling out his log sheet at 4 a.m. He was on his fifth week of 12-hour shifts. He would typically work eight straight days of 12 hours on and 12 hours off, followed by four days off before returning for another eight straight days of 12 hours on and 12 hours off. His 12-hour shifts began at 6 p.m. and ended at 6 a.m. He was on his second day of 12-hour night-shift duty when the incident occurred. He had been awake the whole day before his first 12-hour shift, and had slept for only about four hours before his second night shift. Thus, he had only four hours sleep in the prior 44 hours.

The cooling water hose that ruptured was a four-inch diameter fire hose. The hose, which had been bent around a corner, apparently ruptured due to dry rot when pressurized to about 100 psig. A date of Jun. 8, 1978 had been stenciled on the hose, which was probably the date that the hose was put into service. No records had been kept on hose inspection, storage, maintenance, or testing.

Figure 5:
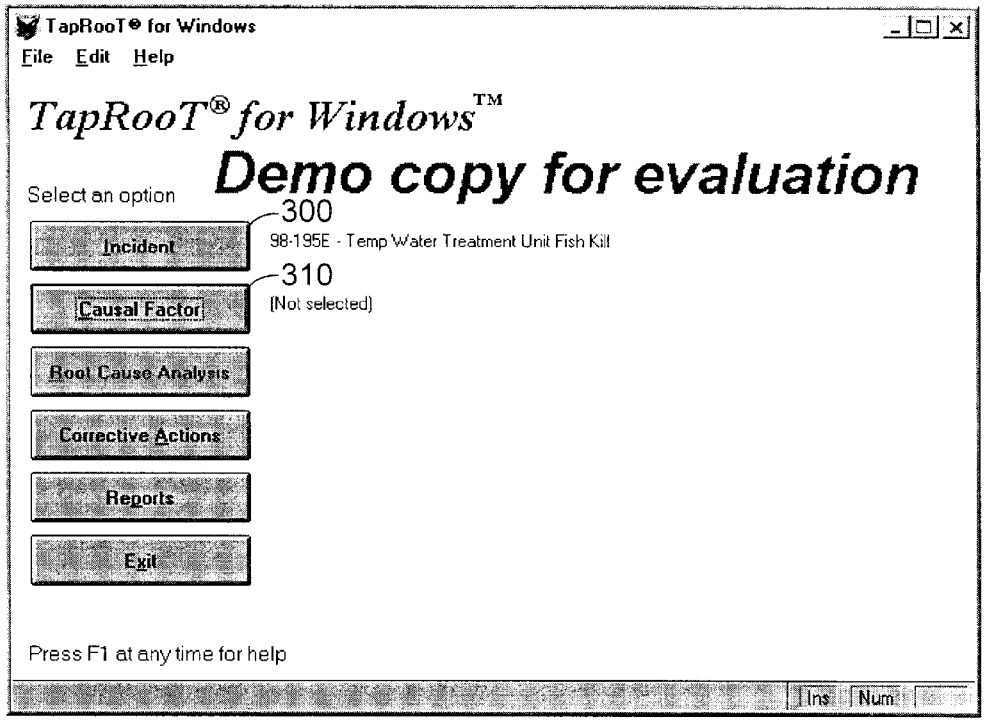
FIG. 5 is an illustration of a main screen generated by a preferred embodiment of the invention.

To select the "Temp Water Treatment Unit Fish Kill" incident, the user clicks on the Select button 360 in FIG. 4. When the processor 20 receives a signal from the input device 10 indicating activation of the Select button 360, the processor 20 generates the main screen of FIG. 5. This screen now indicates the selected incident next to the Incident button 300. Next, the user activates the Causal Factor button 310 to select a causal factor associated with the particular incident.

Figure 6:
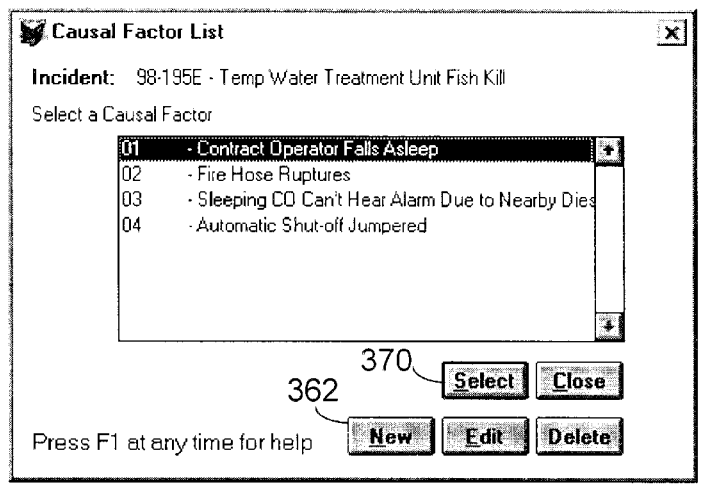
FIG. 6 is an illustration of a Causal Factor List dialog box generated by a preferred embodiment of the invention.

When the processor 20 receives a signal from the input device 10 indicating activation of the Causal Factor button 310, the processor 20 generates the Causal Factor List dialog box shown in the screen of FIG. 6. The Causal Factor List shows possible causal factors associated with a specific incident that have been entered by a user. From the Causal Factor List, the user selects or edits an existing causal factor, or creates a new causal factor using the New button 362. As shown in FIG. 6, four causal factors have previously been identified for the fish kill incident: (1) contract operator (CO) falls asleep, (2) fire hose ruptures, (3) sleeping CO can't hear alarm due to nearby diesel engine, and (4) automatic shut-off jumpered. These are four factors that an investigator has previously determined to be possible causes of the fish kill based on an investigation of the incident. To select one of the causal factors for further analysis, the user highlights the selected causal factor in the list and activates the Select button 370 using the input device 10. For the following example, it will be assumed that the user has selected the "contract officer falls asleep" factor.

Figure 7:
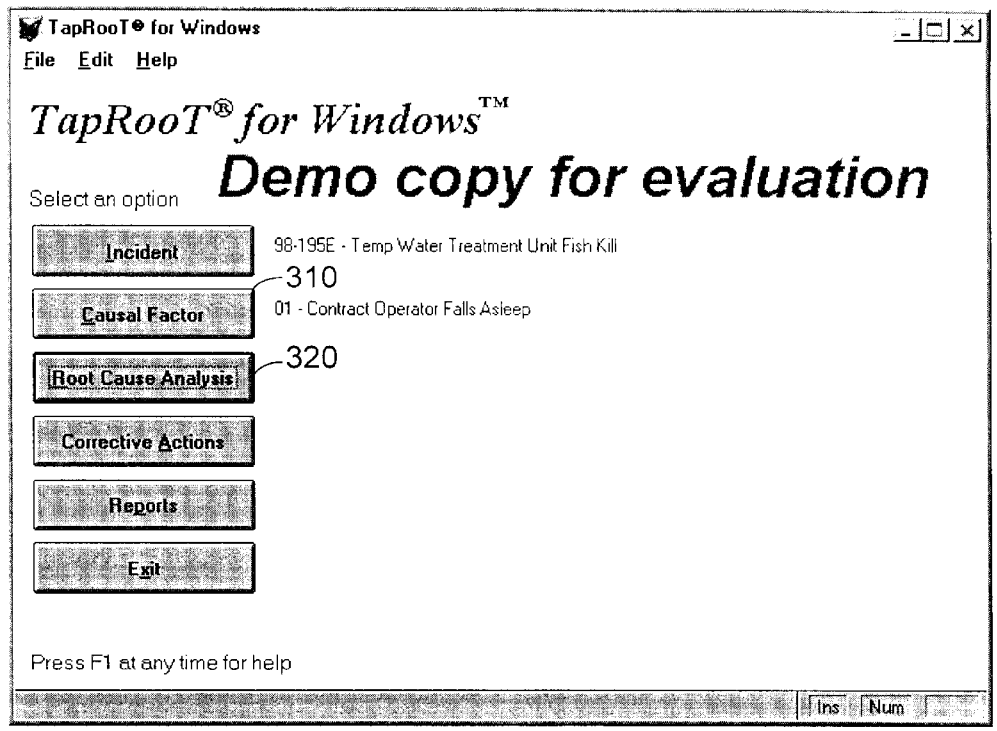
FIG. 7 is an illustration of a main screen generated by a preferred embodiment of the invention.

When the processor 20 receives a signal from the input device 10 indicating activation of the Select button 370, the processor 20 generates the main screen of FIG. 7. This screen indicates the selected causal factor next to the Causal Factor button 310. To commence a root cause analysis for the selected causal factor, the user activates the Root Cause Analysis button 320.

Figure 8:
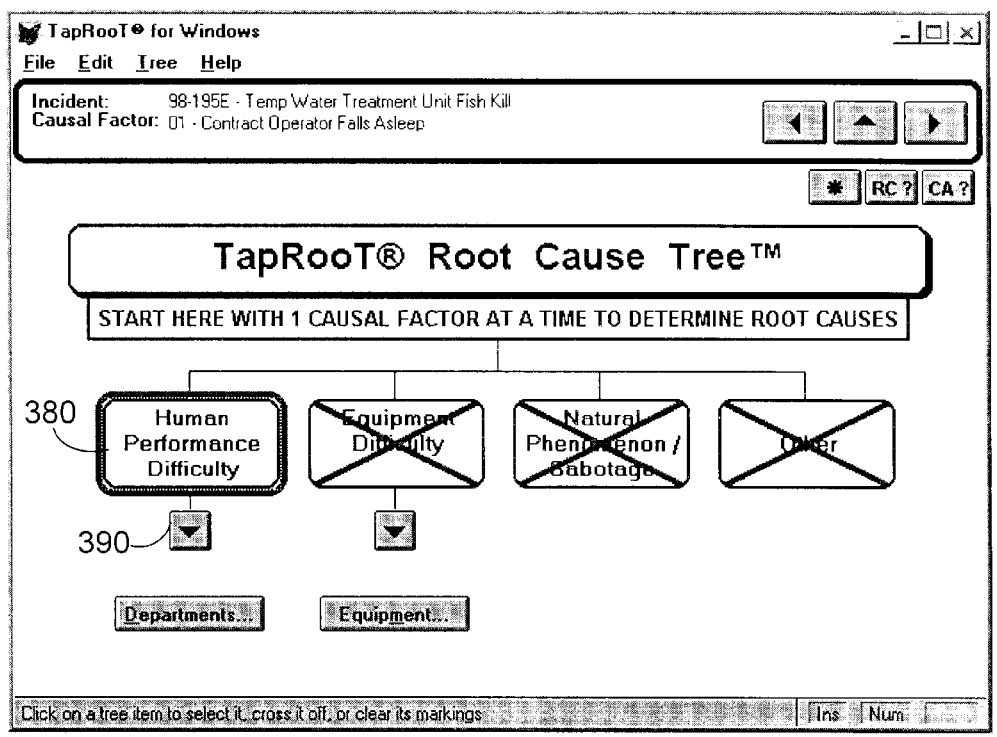
FIG. 8 is an illustration of a Difficulty level screen generated by a preferred embodiment of the invention.

When the processor 20 receives a signal from the input device 10 indicating activation of the Root Cause Analysis button 320, the processor 20 generates the screen shown in FIG. 8. This screen indicates the four categories on the Difficulties level of the causal information database depicted in FIG. 2. Using the input device 10 and the screen of FIG. 8, the user selects a difficulty category into which the selected causal factor falls. In this example, since an operator falling asleep is a human performance problem, the "contract operator falls asleep" causal factor would fall into the Human Performance Difficulty category.

In the preferred embodiment of the invention, the user selects this category by simply placing a display cursor on the Human Performance Difficulty block 380 and "clicking" once on the mouse input device 10. When a particular category is selected, the corresponding category block is highlighted as shown in FIG. 8. Since the "contract officer falls asleep" causal factor does not fall into any of the other three categories, those categories are eliminated from further consideration by clicking twice on their corresponding blocks. As FIG. 8 indicates, an eliminated category is preferably indicated by a crossed out block.

Figure 9:
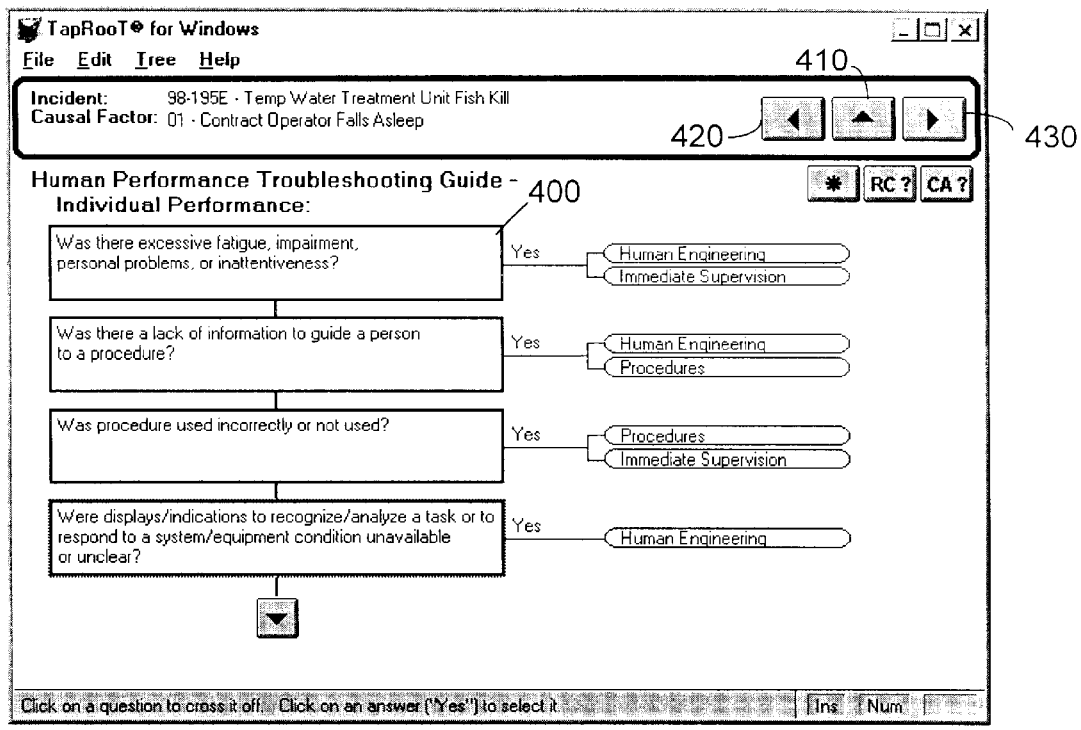
FIG. 9 is an illustration of a first screen of a Human Performance Troubleshooting Guide generated by a preferred embodiment of the invention indicating no user selections.
Figure 10:
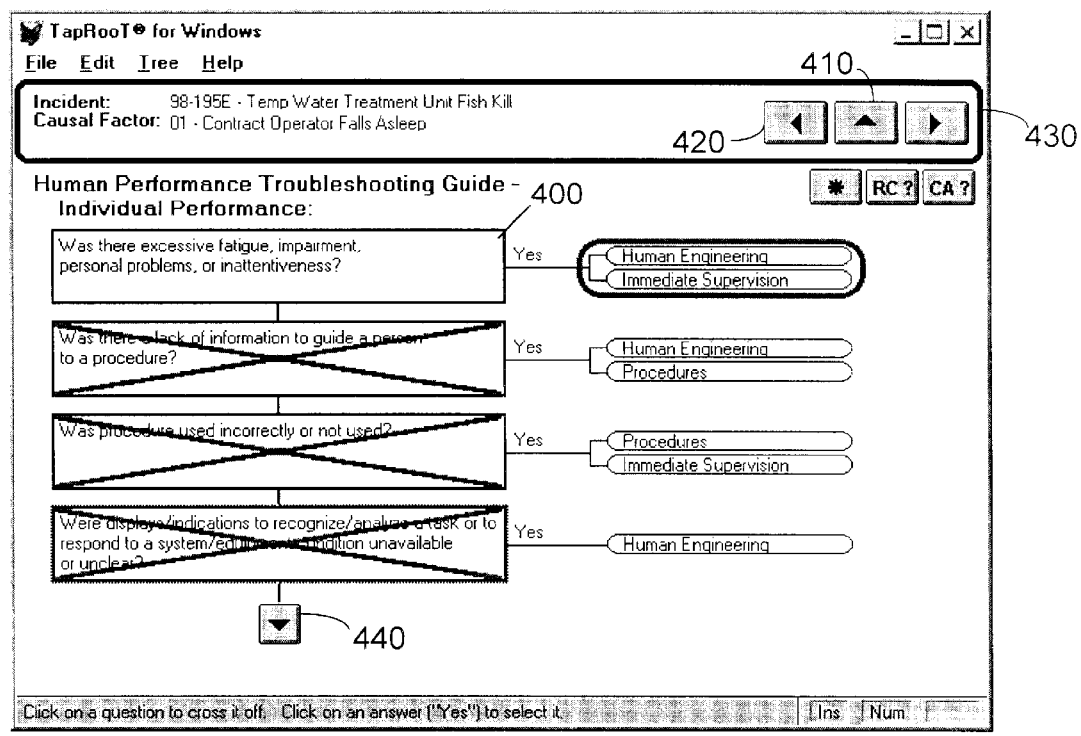
FIG. 10 is an illustration of a first screen of a Human Performance Troubleshooting Guide generated by a preferred embodiment of the invention indicating user selections.

With continued reference to FIG. 8, below the Human Performance Difficulty block 380 is a down-arrow button 390. In the preferred embodiment of the invention, when the processor 20 receives a signal from the input device 10 indicating activation of the button 390, the processor 20 generates the Human Performance Troubleshooting Guide screen shown in FIG. 9. This screen is the first of several screens that present question blocks to the user to illicit information related to the particular incident and the selected causal factor. The preferred question blocks shown in FIG. 9 are related to "Individual Performance" issues. If the user decides that the answer to a particular question is "yes," the user simply clicks on the word "yes" to the right of the question block. For example, the question block 400 in FIG. 9 poses the question: "Was there excessive fatigue, impairment, personal problems, or inattentiveness?" An affirmative answer to this question indicates that a root cause may lie under a Human Engineering or Immediate Supervision basic cause category. When the user clicks on the "yes" to the right of the question block 400, the basic cause categories are highlighted as shown in FIG. 10. To record a negative answer to a question, the user simply double-clicks on the question block, and the block is crossed out as shown in FIG. 10.

At the top right corner of the screen shown in FIG. 10 are a set of three arrow buttons that the invention provides to "navigate" through the various screens shown during the analysis process. When the up-arrow button 410 is pressed, the processor 20 generates the screen representing the next highest level in the analysis process. For example, if the user presses the up-arrow button 410 from the screen of FIG. 10, the processor 20 generates the screen of FIG. 8 again. When the left-arrow button 420 is pressed, the processor 20 generates the screen representing the previous step in the causal analysis process, whether it was on the same level as the current screen or on the previous level. For example, if the user presses the left-arrow button 420 from the screen of FIG. 10, the processor 20 generates the screen of FIG. 8 again. When the right-arrow button 430 is pressed, the processor 20 generates a screen representing the next step in the causal analysis process, whether it is on the same level as the current screen or on the next level. For example, if the user presses the right-arrow button 430 from the screen of FIG. 10, the processor 20 generates the screen of FIG. 11. Below the last question block in FIG. 10 is a down-arrow button 440. When the down-arrow button 440 is pressed, the processor 20 preferably generates the next screen of the Human Performance Troubleshooting Guide, which is the same as that depicted in FIG. 11.

Figure 11:
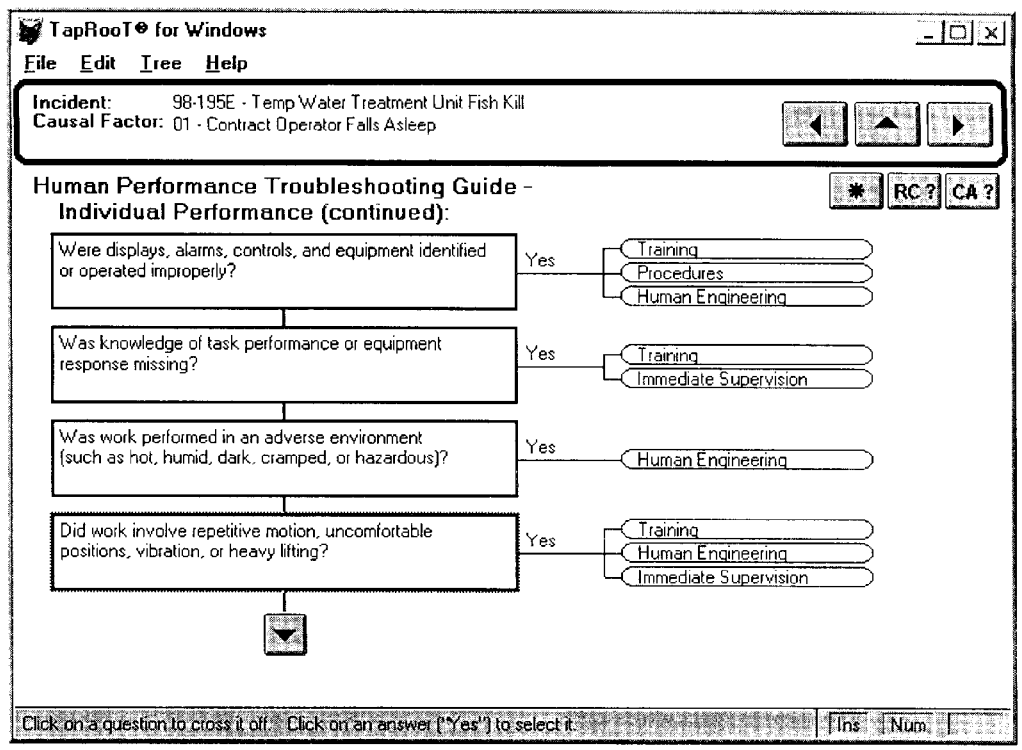
FIG. 11 is an illustration of a second screen of a Human Performance Troubleshooting Guide generated by a preferred embodiment of the invention indicating no user selections.
Figure 12:
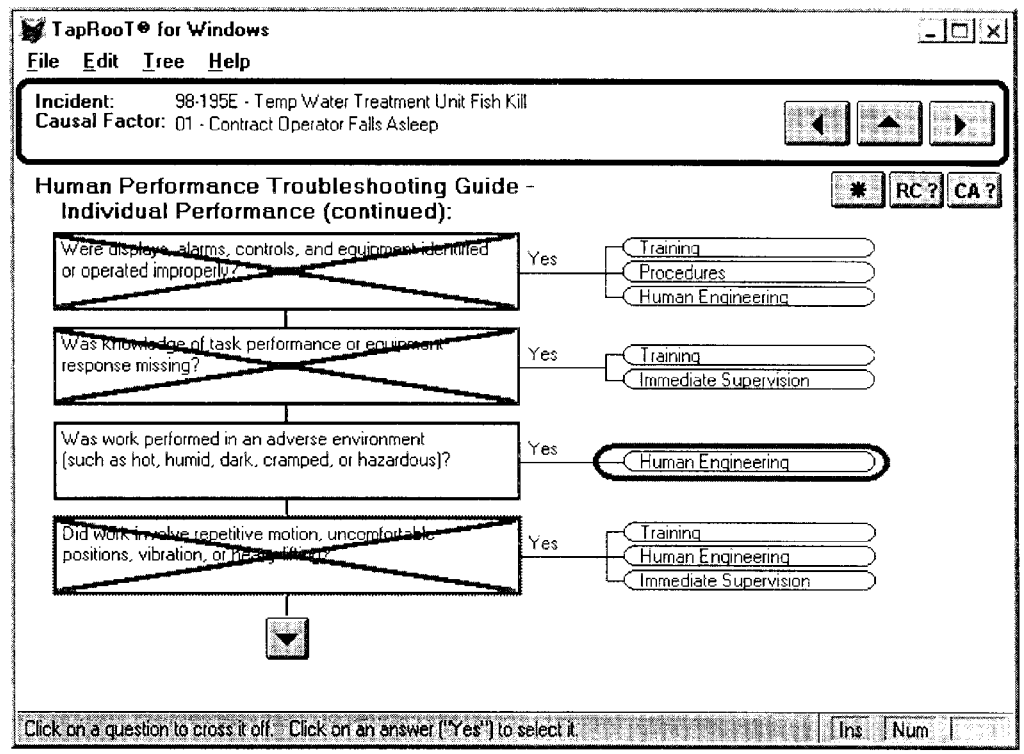
FIG. 12 is an illustration of a second screen of a Human Performance Troubleshooting Guide generated by a preferred embodiment of the invention indicating user selections.
Figure 13:
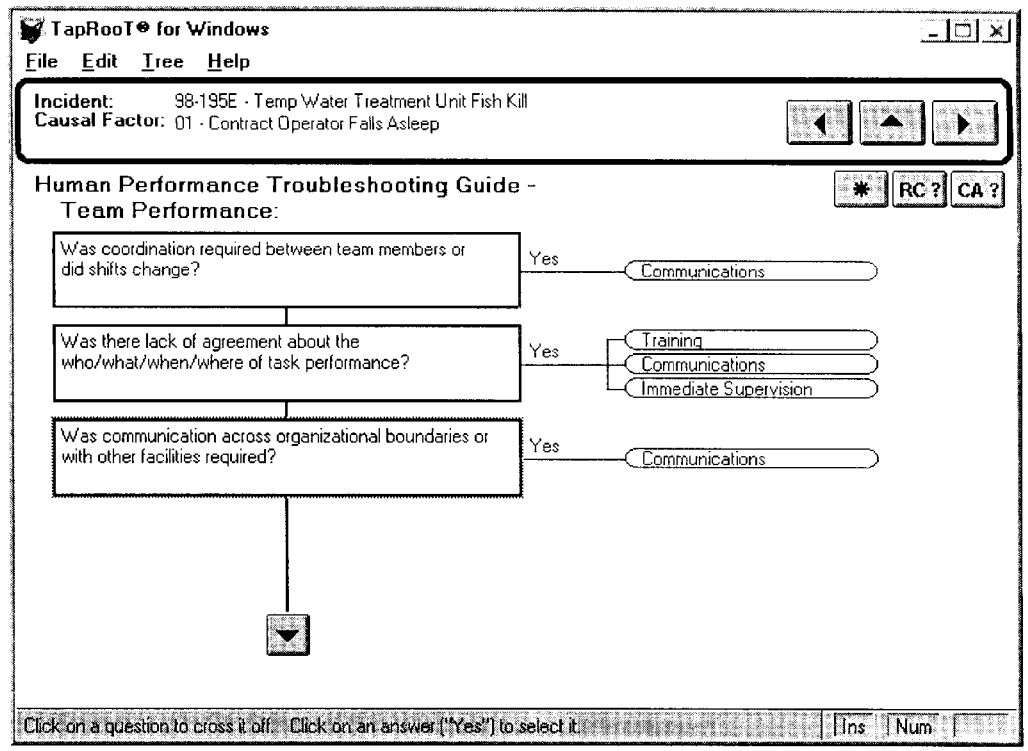
FIG. 13 is an illustration of a third screen of a Human Performance Troubleshooting Guide generated by a preferred embodiment of the invention indicating no user selections.
Figure 14:
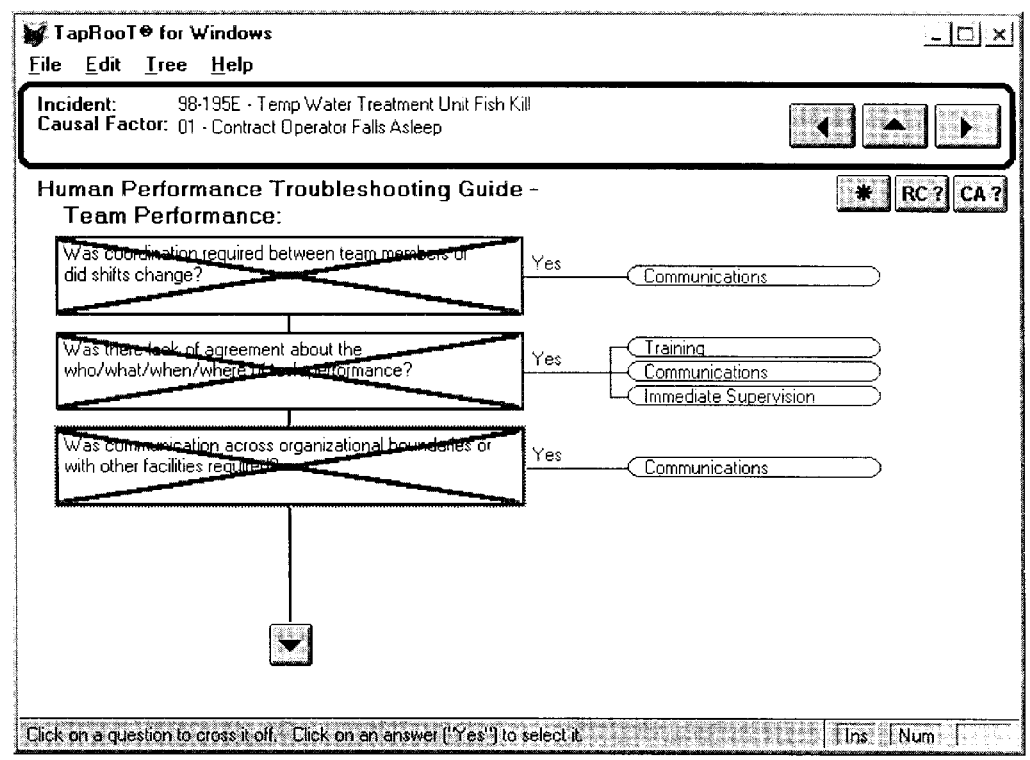
FIG. 14 is an illustration of a third screen of a Human Performance Troubleshooting Guide generated by a preferred embodiment of the invention indicating user selections.
Figure 15:
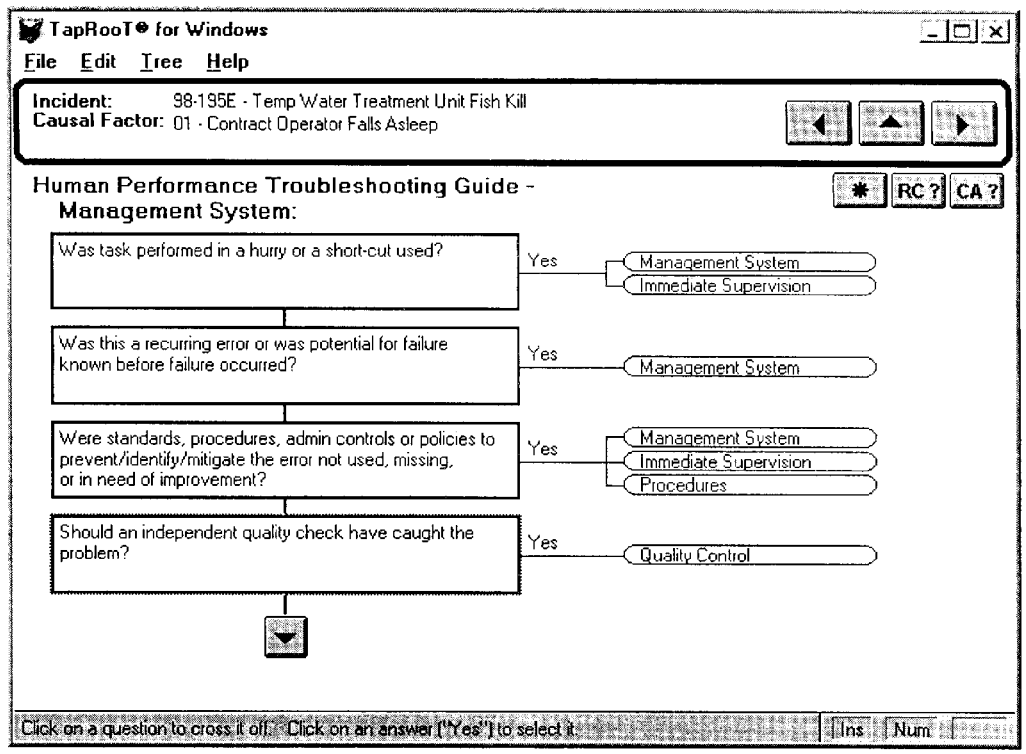
FIG. 15 is an illustration of a fourth screen of a Human Performance Troubleshooting Guide generated by a preferred embodiment of the invention indicating no user selections.

FIGS. 11, 13, and 15 show the preferred screens presenting the remaining question blocks of the Human Performance Troubleshooting Guide. FIG. 11 presents further questions relating to "Individual Performance," FIG. 13 presents questions relating to "Team Performance," and FIG. 15 presents questions relating to the "Management System." When the user answers the questions for the "contract officer falls asleep" causal factor, the screens appear as shown in FIGS. 12, 14, and 16.

Figure 16:
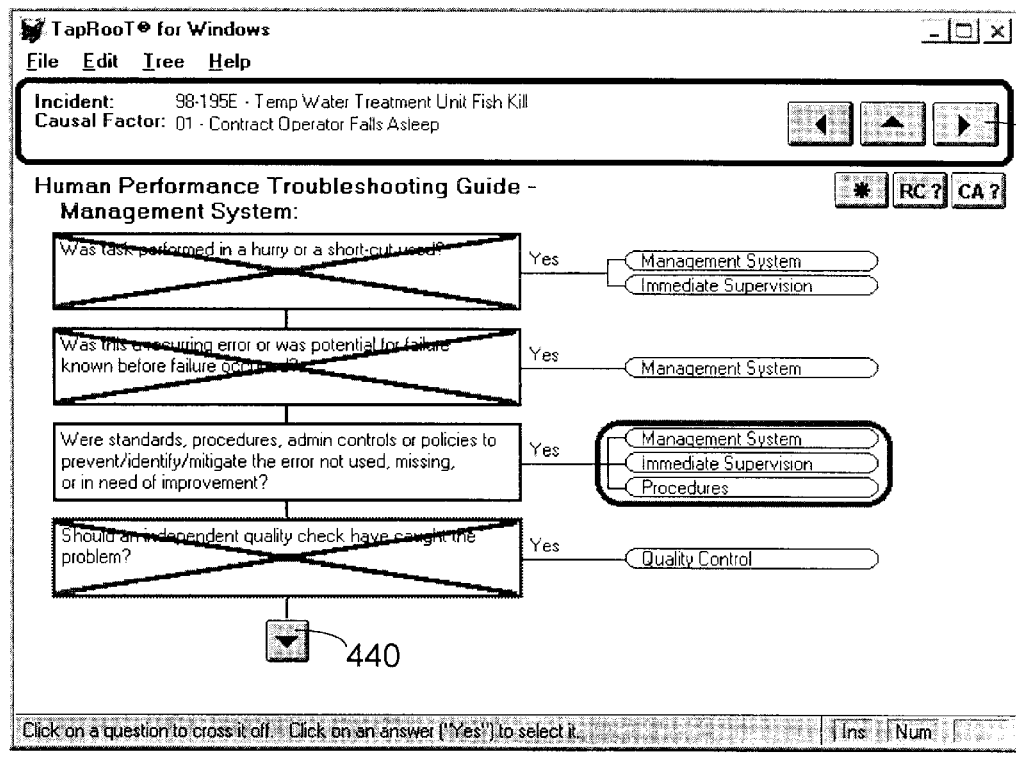
FIG. 16 is an illustration of a fourth screen of a Human Performance Troubleshooting Guide generated by a preferred embodiment of the invention indicating user selections.
Figure 17:
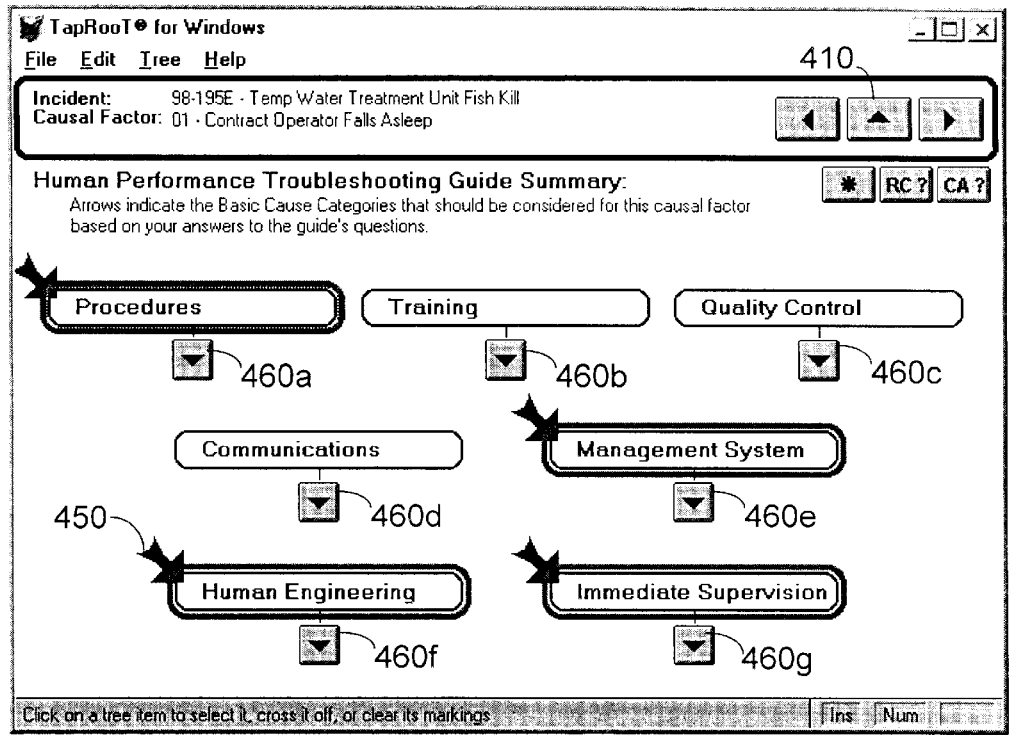
FIG. 17 is an illustration of a Human Performance Troubleshooting Guide Summary screen generated by a preferred embodiment of the invention.

When the user presses the down-arrow button 440 or the right-arrow button 430 shown in FIG. 16, the processor 20 generates the Human Performance Troubleshooting Guide Summary screen shown in FIG. 17. This screen indicates the seven basic cause categories that fall under the Human Difficulty category in the causal information database. These basic cause categories reside at the Basic Cause level as shown in FIG. 2. The basic cause categories highlighted by the arrows 450 are categories indicated by affirmative answers to the questions presented in the screens of FIGS. 9–16. In other words, the highlighted categories of FIG. 17 are basic cause categories into which the root cause of the incident may fall.

Beneath each of the basic cause category blocks shown in the screen of FIG. 17 are down-arrow buttons 460a–460g. When a user presses a down arrow button beneath any of the categories, the processor 20 advances the causal analysis down to the next level in the causal information database structure. For example, when the user presses the down-arrow button 460a under the Procedures category, the processor 20 generates the screen shown in FIG. 18. This screen illustrates the Near Root Cause level categories under the Procedures category. These categories are represented by a procedures "not-used/not-followed" block 470, a procedures "wrong" block 480, and a procedures "followed incorrectly" block 490. Below each of the Near Root Cause level category blocks 470–490 is a list of potential root causes. These root causes lie on the Root Cause level of the causal information database. For the causal factor of this example, "contract operator falls asleep," none of the Near Root Cause level categories are applicable. Thus, the user would cross out each of the category blocks 470–490. In this manner, the user has indicated that none of the root causes listed beneath the category blocks 470–490 are possible root causes for this example.

Figure 18:
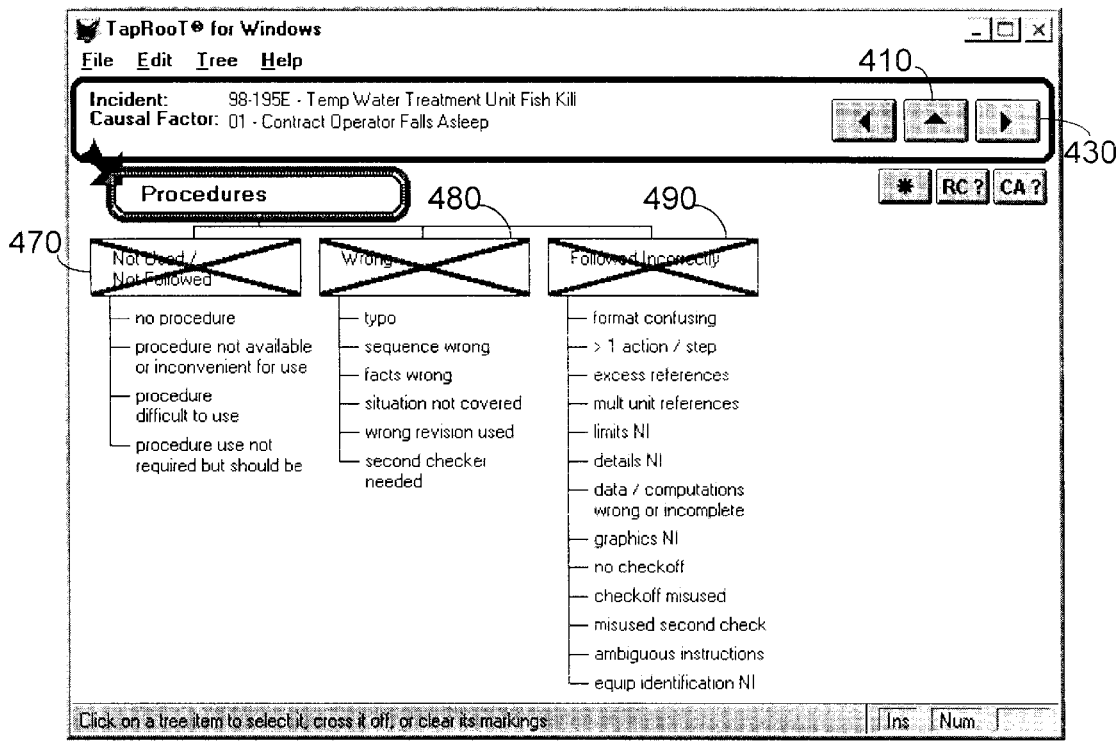
FIG. 18 is an illustration of a screen showing the Near Root Cause and Root Cause level categories under the Procedures category generated by a preferred embodiment of the invention.

The user may advance to the next relevant basic cause category, "Management System," by pressing the right-arrow button 430 in FIG. 18. Alternatively, the user may return to the Human Performance Troubleshooting Guide Summary screen of FIG. 17 by pressing the up-arrow button 410 as shown in FIG. 18, and then advance to the "Management System" basic cause category by pressing the down-arrow button 460e under the "Management System" block. When the user does so, the processor 20 generates the screen shown at FIG. 19.

Figure 19:
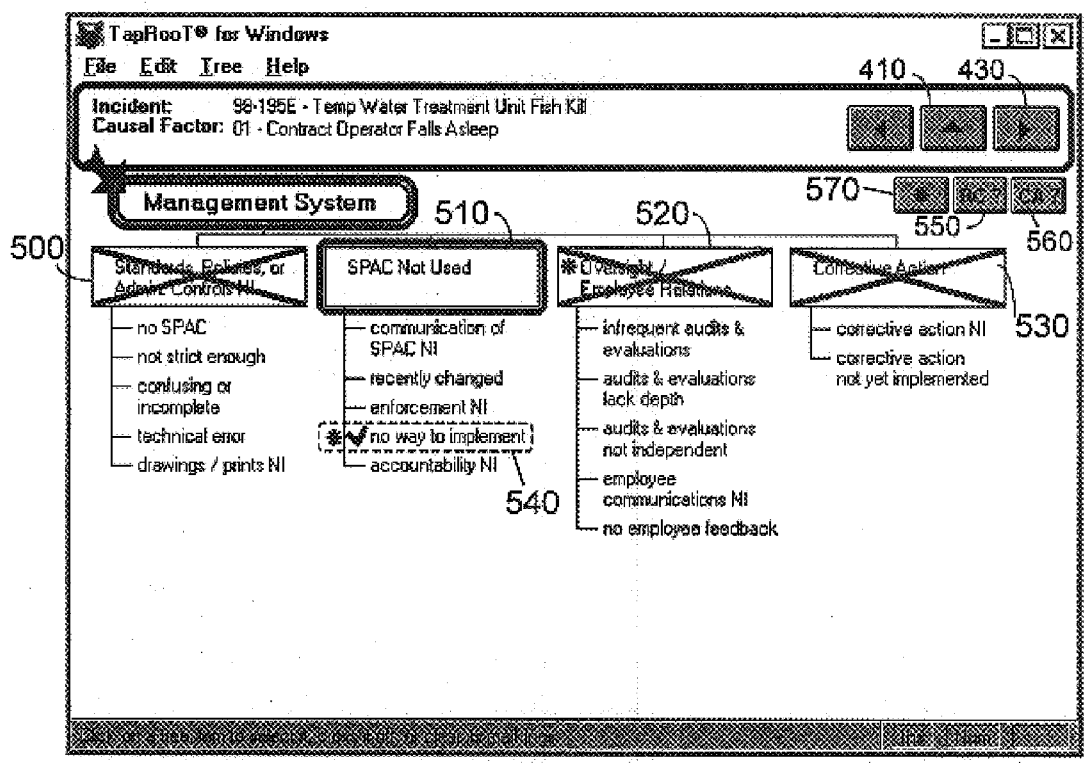
FIG. 19 is an illustration of a screen showing the Near Root Cause and Root Cause level categories under the Management System category generated by a preferred embodiment of the invention.

The screen of FIG. 19 illustrates the Near Root Cause level categories under the "Management System" category. These categories are represented by a "standards, policies, or administrative controls (SPAC)" block 500, a "SPAC not used" block 510, an "oversight/employee relations" block 520, and a "corrective action" block 530.

Below each of the Near Root Cause level category blocks 500–530 shown in FIG. 19 is a list of potential root causes. For the current example, the user may decide that although a relevant management policy was available, it was not used in this situation. Thus, the user proceeds down the list of potential root causes under the block 510 to determine which root cause was applicable in this case. To aid the user in making this decision, the preferred embodiment of the invention offers assistance in the form of further questions related to each potential root cause. To activate this feature of the preferred embodiment, the user clicks the input device 10 on the RC? button 550 and then on the text of the potential root cause. For example, if the user clicks on the RC? button 550 and then on the text "no way to implement," the processor 20 generates the message shown in FIG. 20 on the display device 40.

Figure 20:
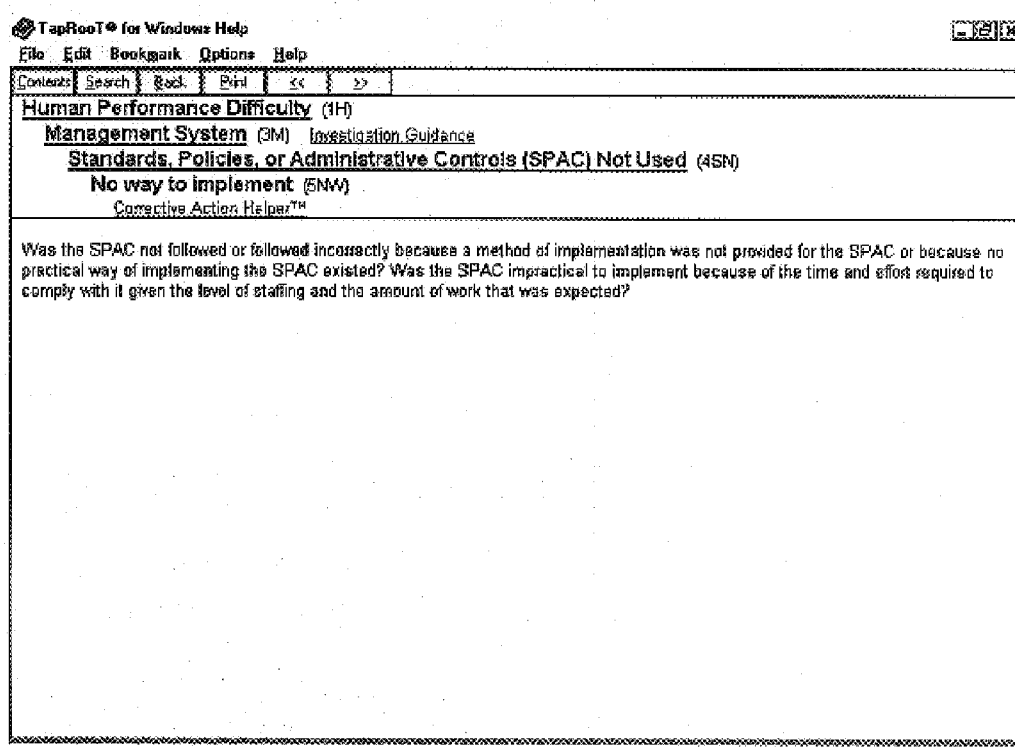
FIG. 20 is an illustration of a screen showing an exemplary message contained in a root cause helper database generated by a preferred embodiment of the invention.

In the preferred embodiment, the message shown in FIG. 20 is one of many messages contained in the root cause helper database stored in the memory device 30 or in the information storage device 60. Preferably, the root cause helper database is a distinct software module that is linked to the causal information database. Alternatively, the root cause helper database may be a component of a larger database that includes the causal information database. In either case, each root cause contained in the causal information database, such as each root cause listed under the Near Root Cause level category blocks 500–530 shown in FIG. 19, is linked to a corresponding message in the root cause helper database.

When the user decides that a potential root cause is actually a root cause of the incident, the user selects the root cause by clicking once on the text of the root cause. For example, below the "SPAC not used" category 510 in FIG. 19, the user has checked the root cause: "no way to implement" 540 as a reason for why a SPAC was not used. When the user clicks on the text of a root cause, the processor 20 designates the root cause and generates a check mark next to the text as shown in FIG. 19.

Now that the system has helped the user pinpoint a root cause of the particular incident of this example, one of the most powerful features provided by the preferred embodiment of the invention is utilized to help the user determine corrective action to prevent future occurrences of similar incidents. The Corrective Action Helper™ is a database of suggested corrective actions that are linked to root causes on the Root Cause level of the causal information database. Preferably, each root cause contained in the causal information database, such as each root cause listed under the Near Root Cause level category blocks 500–530 shown in FIG. 19, is linked to a corresponding corrective action in the Corrective Action Helper™ database. In a preferred embodiment, the Corrective Action Helper™ database is stored in the memory device 30. Alternatively, it is stored on the information storage device 60.

Figure 21:
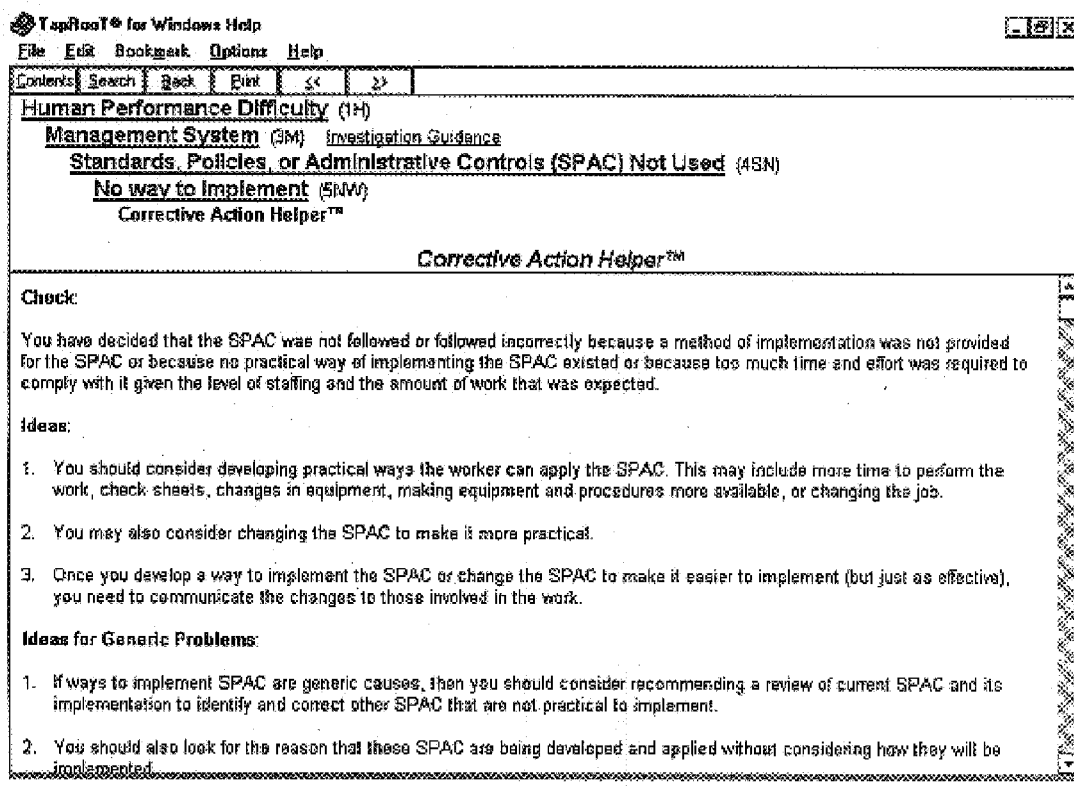
FIG. 21 is an illustration of a screen showing exemplary corrective action suggestions contained in a Corrective Action Helper™ database generated by a preferred embodiment of the invention.

The processor 20 accesses the Corrective Action Helper™ database when the user clicks on the CA? button 560 and then on the text of the selected root cause. For example, if the user clicks on the CA? button 560 and then on the text "no way to implement," the processor 20 generates the message shown in FIG. 21 on the display device 40. As shown in FIG. 21, the Corrective Action Helper™ database provides suggestions and ideas for eliminating the root cause of the incident. These suggestions and ideas provide the user with a framework for thinking about solutions to the specific problem. By thinking within the framework provided by the Corrective Action Helper™ database, the user can stay focused on eliminating the specific root cause of the specific causal factor.

In the preferred embodiment, the Corrective Action Helper™ database is a distinct software module residing on the memory device 30 or on the information storage device 60. Alternatively, the Corrective Action Helper™ database may be a component of a larger database that includes the causal information database and the root cause helper database.

In the preferred embodiment of the invention, the corrective actions provided in the Corrective Action Helper™ database are supplied as an integral part of the invention. Thus, the contents of the Corrective Action Helper™ database are available to the user upon the user's first use of the invention. Preferably, the Corrective Action Helper™ database may not be modified by the user. However, in an alternative embodiment, the user may add corrective action suggestions to be associated with particular root causes, based on the user's experience.

Figure 22:
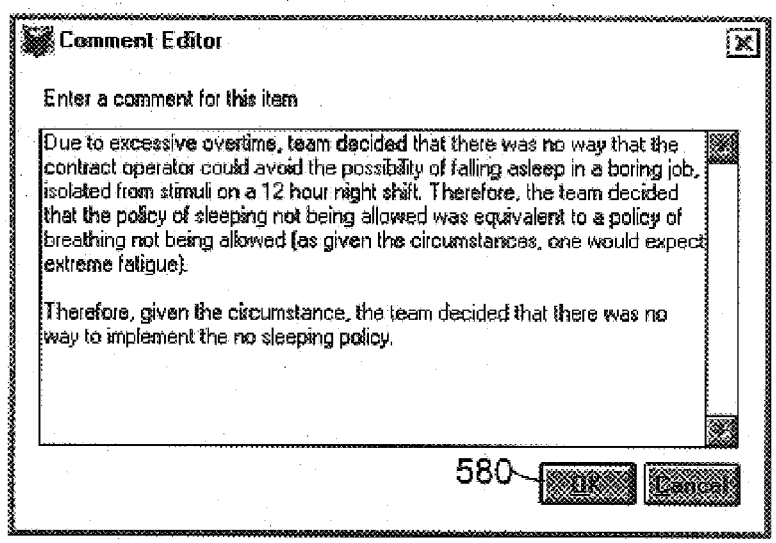
FIG. 22 is an illustration of a Comment Editor dialog box generated by a preferred embodiment of the invention.

The system also allows the user to compose and store comment fields that can be associated with any category at any analysis level. Preferably, the existence of a comment field is indicated by an asterisk on a display screen. For example, as shown in FIG. 19, the root cause "no way to implement" under the "SPAC Not Used" category block 510 includes a comment field. To create a new comment field, or to edit an existing comment field, the user clicks on the comment button 570 depicted in FIG. 19, and then clicks on the root cause text or category block with which the comment is to be associated. When the user performs this sequence using the input device 10, the processor 20 generates on the display device 40 a Comment Editor box as shown in FIG. 22. This Comment Editor box is an interface to a simple text editor module in which the user may enters or edits text relating to the associated root cause or category block. When the user clicks on the OK button 580, the comment text is stored on the memory device 30 or the information storage device 60.

After the user completes all of the analysis steps under the Management System category, the user advances to another relevant basic cause category, such as "Human Engineering," by pressing the right-arrow button 430 in FIG. 19. Alternatively, the user returns to the Human Performance Troubleshooting Guide Summary screen of FIG. 17 by pressing the up-arrow button 410 as shown in FIG. 19, and then advances to the "Human Engineering" basic cause category by pressing the down-arrow button 460f under the "Human Engineering" block. When the user does so, the processor 20 generates the screen shown at FIG. 23.

Figure 23:
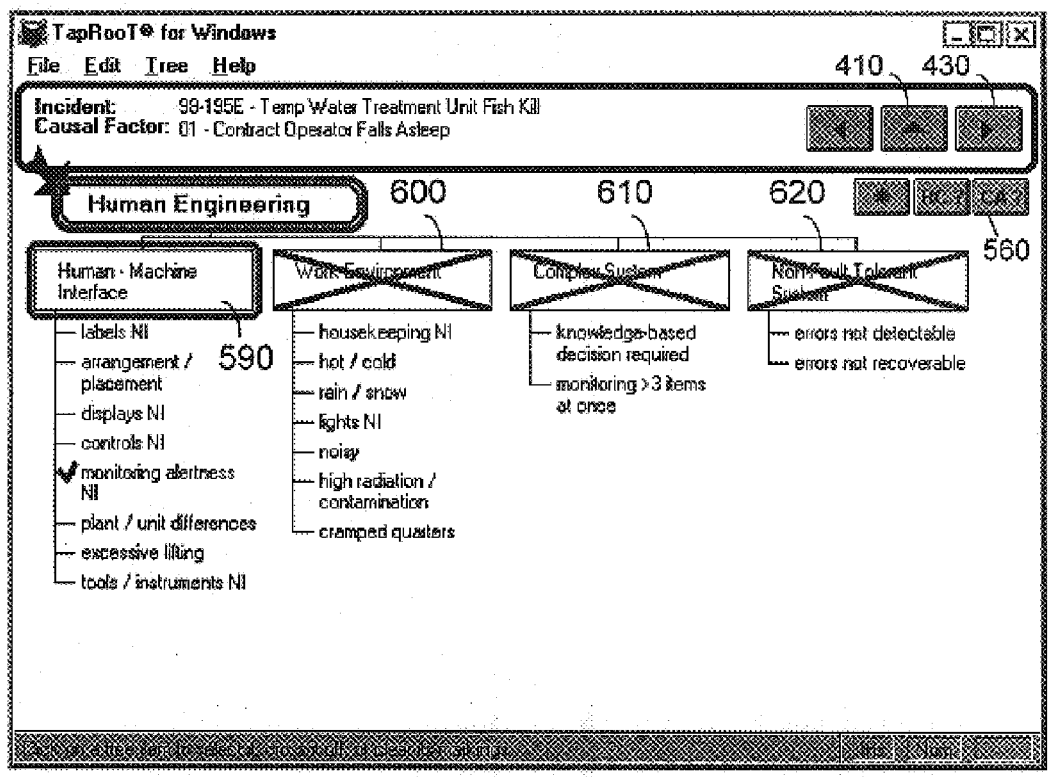
FIG. 23 is an illustration of a screen showing the Near Root Cause and Root Cause level categories under the Human Engineering category generated by a preferred embodiment of the invention.

The screen shown at FIG. 23 illustrates preferred Near Root Cause level categories under the "Human Engineering" category. These categories are represented by a "Human-Machine Interface" block 590, a "Work Environment" block 600, a "Complex System" block 610, and a "Non-Fault Tolerant System" block 620. Since the causal factor of the current example, "contract operator falls asleep," involves a human's loss of control over a machine, the user highlights the "Human-Machine Interface" block 590 at the Near Root Cause level. Beneath the block 590, the user checks "monitoring alertness needs improvement (NI)" at the Root Cause level. In this example, it has been assumed that the user decides that the other Near Root Cause level categories are not relevant, and crosses them out by double clicking on each.

At this point in the analysis of a particular incident, the user has narrowed the cause of the incident down to one or more root causes. However, the user may have no idea what to do to eliminate a root cause, and thus preventing the incident from recurring. Prior incident analysis systems offer no further help to the user. However, as described further below, the Corrective Action Helper™ of the present invention provides additional help in the form of suggested actions that the user may take to resolve the problem.

To access corrective action suggestions from the Corrective Action Helper™ relating to the "monitoring alertness needs improvement (NI)" root cause, the user clicks on the CA? button 560 at the upper right corner of FIG. 23. When the user clicks on the CA? button 560 and then on the "monitoring alertness needs improvement (NI)" text, the processor 20 accesses the Corrective Action Helper™ database and retrieves corrective action suggestions linked to this root cause. Preferably, the processor 20 then generates the screen shown in FIG. 24 to display the linked corrective actions.

Figure 24:
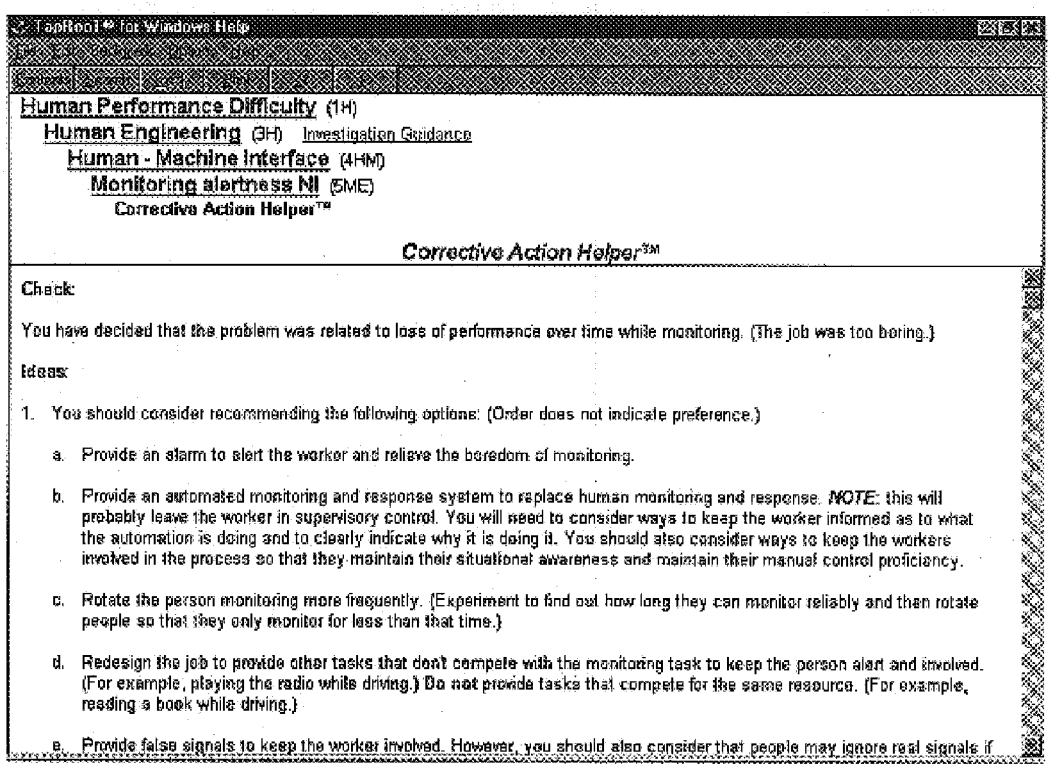
FIG. 24 is an illustration of a screen showing exemplary corrective action suggestions contained in a Corrective Action Helper™ database generated by a preferred embodiment of the invention.

As shown in FIG. 24, one of the suggested corrective actions (d) is to provide other "noncompeting" tasks for the operator to perform while the operator is monitoring a critical parameter. For example, to prevent recurrence of the "Temp Water Treatment Unit Fish Kill" incident, the operator may be given an additional task of generating reports of measured values of the cooling water pressure and the temperature of the treatment unit's resin. This corrective action is applicable to a wide variety of industrial monitoring situations where the operator must remain alert, but where perhaps the operator's continuous and full attention is not needed for the task. Further, this suggested corrective action is not an obvious solution, even to people who routinely do this sort of trouble-shooting. As FIG. 24 indicates, the invention typically provides multiple suggestions for actions that may be implemented separately or in concert.

When the user has completed all of the analysis steps under the Human Engineering" category, the user advances to another relevant basic cause category, such as "Immediate Supervision," by pressing the right-arrow button 430 in FIG. 23. Alternatively, the user returns to the Human Performance Troubleshooting Guide Summary screen of FIG. 17 by pressing the up-arrow button 410 as shown in FIG. 23, and then advances to the "Immediate Supervision" basic cause category by pressing the down-arrow button 460g under the "Immediate Supervision" block. When the user does so, the processor 20 preferably generates the screen shown at FIG. 25.

Figure 25:
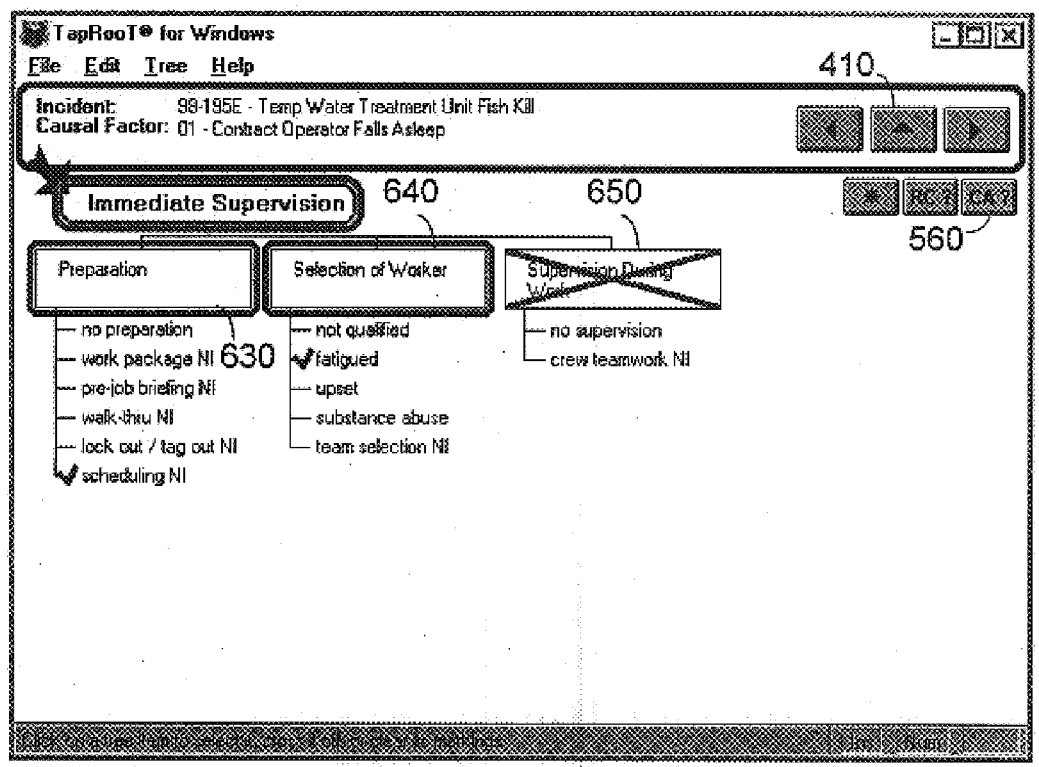
FIG. 25 is an illustration of a screen showing the Near Root Cause and Root Cause level categories under the Immediate Supervision category generated by a preferred embodiment of the invention.

The screen of FIG. 25 illustrates the preferred Near Root Cause level categories under the "Immediate Supervision" category. These are categories that indicate possible problems with procedures followed by or decisions made by the immediate supervisor of the operator who had fallen asleep. These categories are represented by a "Preparation" block 630, a "Selection of Worker" block 640, and a "Supervision During Work" block 650. For the causal factor of the current example, an operator may fall asleep because of lack of preparation for the shift or because of being on the job for too long at a single stretch. The operator may have been unprepared for the night shift due to a scheduling problem. For example, a scheduling problem may exist if the operator has not had enough sleep due to a work schedule that is not conducive to sleeping during off hours. If one or more of these situations apply, the user highlights the "Preparation" block 630 and the "Selection of Worker" block 640 at the Near Root Cause level. Beneath the block 630, the user checks "scheduling needs improvement (NI)" at the Root Cause level, and beneath the block 640, the user checks "fatigued" at the Root Cause level. In this example, the user decides that the other Near Root Cause level category is not relevant, and crosses it out by double clicking on its block.

Figure 26:
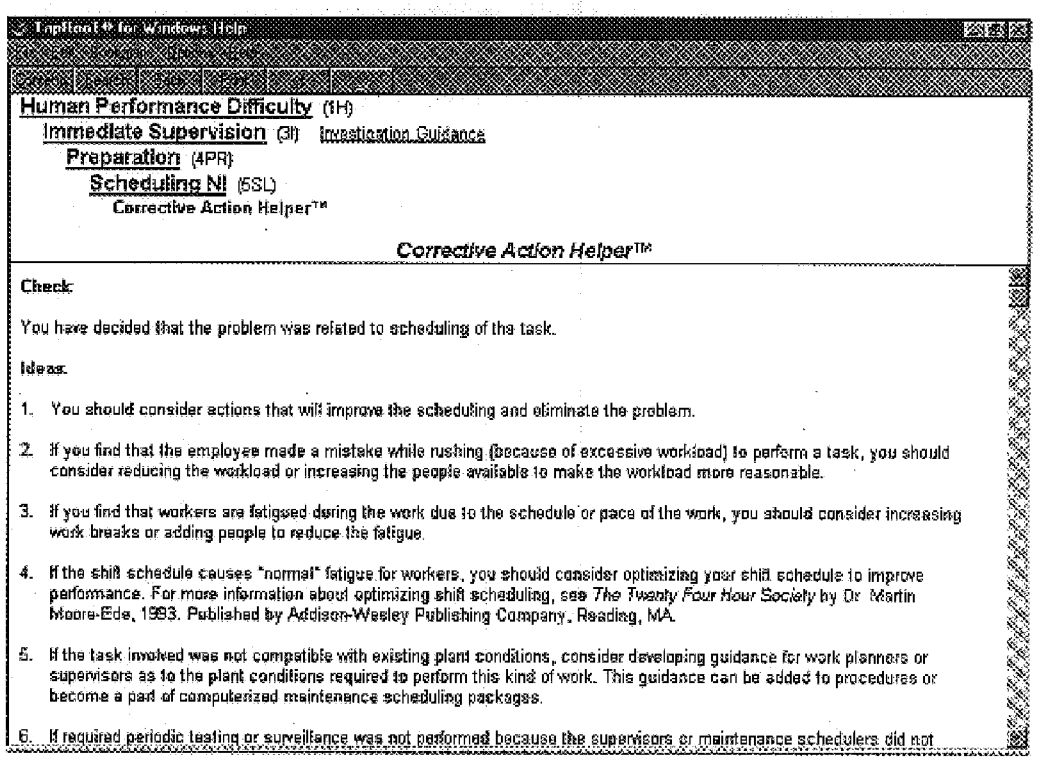
FIGS. 26–27 are illustrations of screens showing exemplary corrective action suggestions contained in a Corrective Action Helper™ database generated by a preferred embodiment of the invention.
Figure 27:
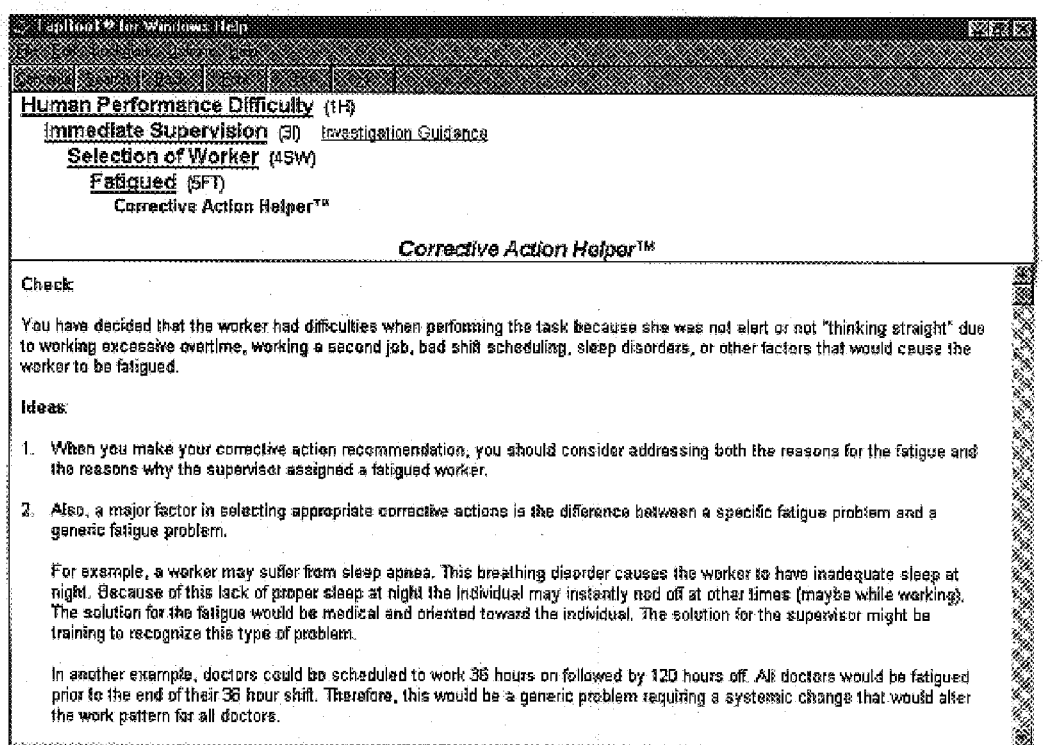

By clicking on the CA? button 560 at the upper right corner of FIG. 25, the user accesses corrective action suggestions relating to the "scheduling needs improvement (NI)" and "fatigued" root causes. When the user clicks on the CA? button 560 and then on the "scheduling needs improvement (NI)" text, the processor 20 accesses the Corrective Action Helper™ database and retrieves corrective action suggestions linked to this root cause. The processor 20 preferably generates the screen shown in FIG. 26 to display the linked category. Similarly, when the user clicks on the CA? button 560 and then on the "fatigued" text, the processor 20 preferably accesses the Corrective Action Helper™ database, retrieves corrective action suggestions linked to this root cause, and generates the screen as shown in FIG. 27 on the display device 40.

At this point in the current example, the user has viewed the Near Root Cause and Root Cause levels beneath each of the basic cause categories that were determined to be relevant based on the user's answers to the questions illustrated in FIGS. 9–16. Thus, at this point, the system has completed the root cause analysis steps that are relevant to the "contract officer falls asleep" causal factor. In an actual use situation, the user might proceed at this time to the Corrective Action or Reports options, as described in detail hereinafter. However, for completeness, this description continues with discussions of the Near Root Cause and Root Cause levels beneath the other basic cause categories that have not yet been described.

The user returns to the Human Performance Troubleshooting Guide Summary screen of FIG. 17, such as by pressing the up-arrow button 410 as shown in FIG. 25, and then advances to the "Training" basic cause category by pressing the down-arrow button 460b under the "Training" block. When the user does so, the processor 20 preferably generates the screen shown at FIG. 28. This screen illustrates the Near Root Cause level and Root Cause level categories under the "Training" category. The near root cause categories are represented by a "No Training" block 660, and an "Understanding NI" block 670. Since these categories are not relevant to the "contract officer falls asleep" causal factor, the user does not check any of the Root Cause level categories in the screen shown at FIG. 28.

Figure 28:
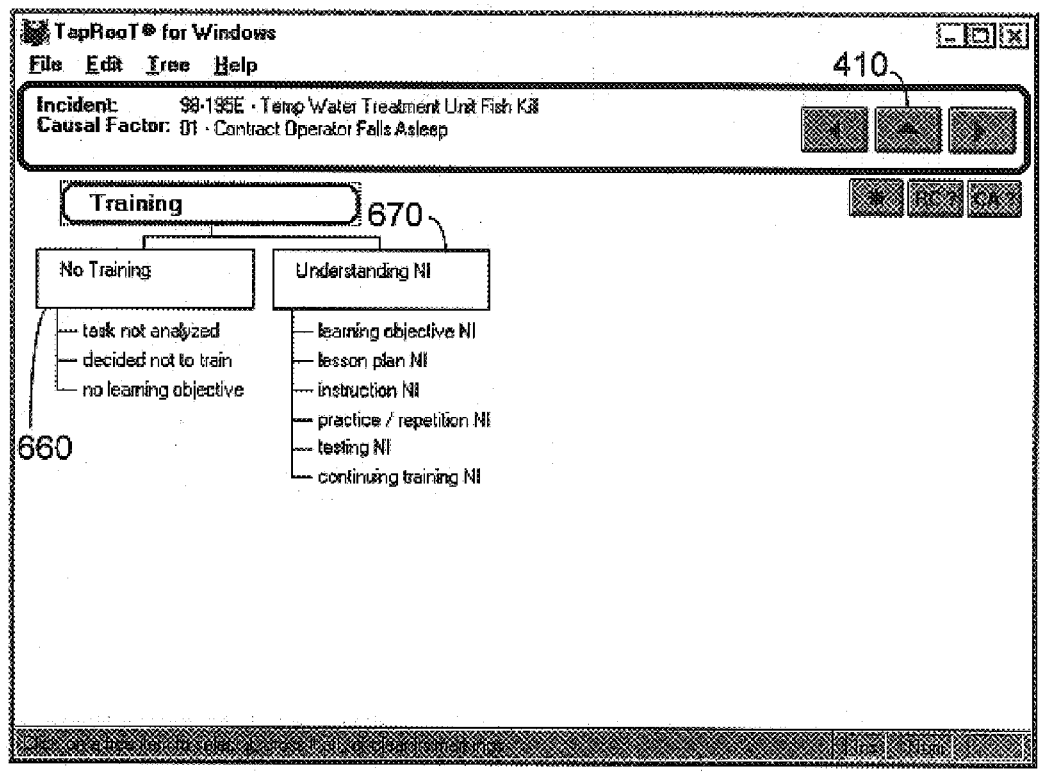
FIG. 28 is an illustration of a screen showing the Near Root Cause and Root Cause level categories under the Training category generated by a preferred embodiment of the invention.

The user views the "Quality Control" basic cause category by pressing the up-arrow button 410 in the screen of FIG. 28 and then the down-arrow button 460c under the "Quality Control" block in the screen of FIG. 17. When the user does so, the processor 20 preferably generates the screen shown at FIG. 29. This screen illustrates the Near Root Cause level and Root Cause level categories under the "Quality Control" category. In the preferred embodiment, the near root cause categories under the "Quality Control" category are represented by a "No Inspection" block 680 and a "Quality Control (QC) NI" block 690. Since these categories are not relevant to the "contract officer falls asleep" causal factor, the user does not check any of the Root Cause level categories in the screen shown at FIG. 29.

Figure 29:
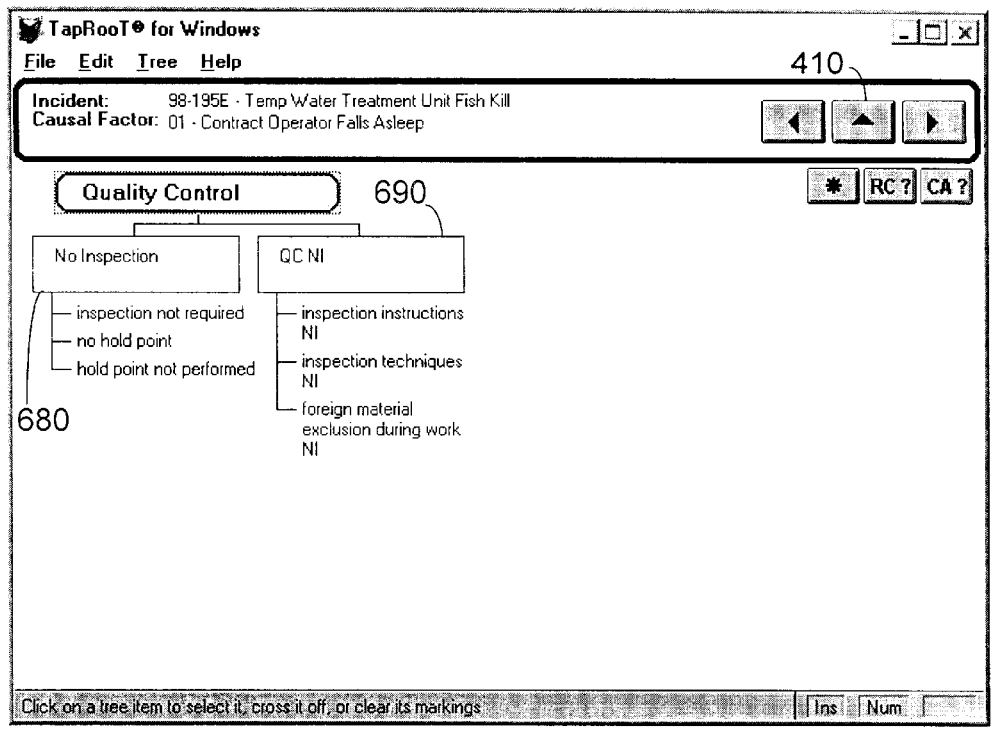
FIG. 29 is an illustration of a screen showing the Near Root Cause and Root Cause level categories under the Quality Control category generated by a preferred embodiment of the invention.
Figure 30:
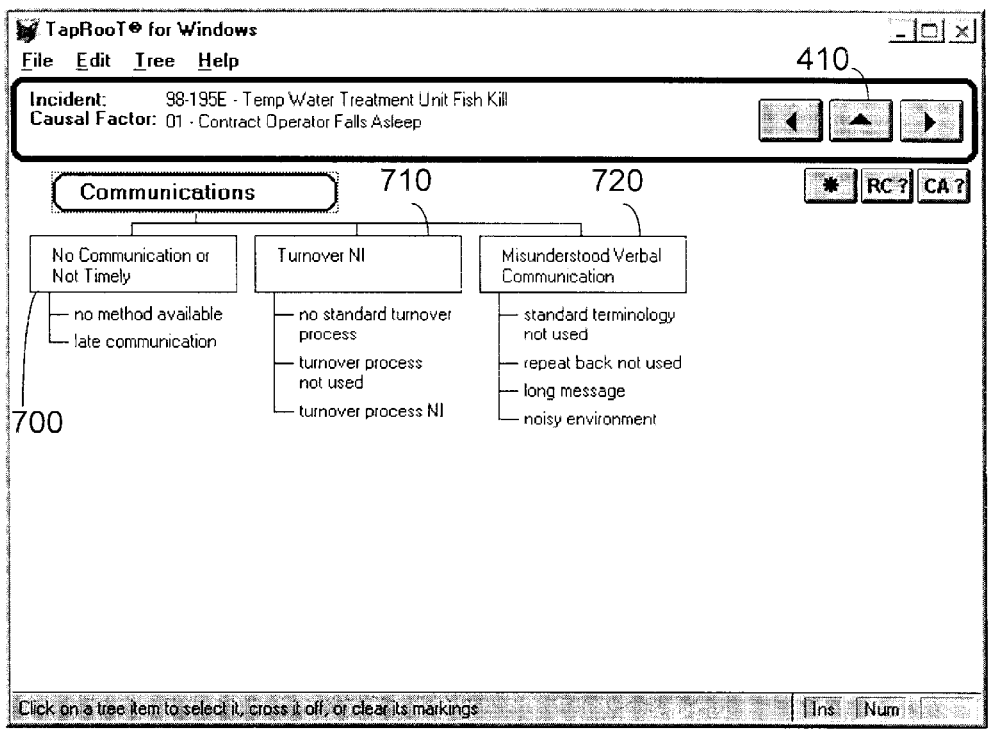
FIG. 30 is an illustration of a screen showing the Near Root Cause and Root Cause level categories under the Communications category generated by a preferred embodiment of the invention.

Preferably, the user views the "Communications" basic cause category by pressing the up-arrow button 410 in the screen of FIG. 29 and then the down-arrow button 460d under the "Communications" block in the screen of FIG. 17. When the user does so, the processor 20 generates the screen shown at FIG. 30. This screen illustrates the Near Root Cause level and Root Cause level categories under the "Communications" category. In the preferred embodiment, the near root cause categories under the "Communications" category are represented by a "No Communication or Not Timely" block 700, a "Turnover NI" block 710, and a "Misunderstood Verbal Communication" block 720. Again, since these categories are not relevant to the "contract officer falls asleep" causal factor, the user does not check any of the Root Cause level categories in the screen shown at FIG. 30.

For each of the difficulty categories, basic cause categories, near root cause categories, and root cause categories that were selected (highlighted or checked) by the user in the previously-described screens, the processor 20 preferably stores an indication, or tag, of these selections in the memory device 30. In this manner, the system maintains a step-by-step record of the root cause analysis process that the user has completed.

From the Main screen, depicted in FIG. 3, the user can now view a summary of all suggested corrective actions associated with the current causal factor, or generate various reports of the analysis results. To return to the Main screen from the screen shown in FIG. 30, the user clicks once on the up-arrow button 410 to return to the Human Performance Troubleshooting Guide Summary screen of FIG. 17, and again on the up-arrow button 410 to return to the Main screen of FIG. 3.

Figures 31, 32:
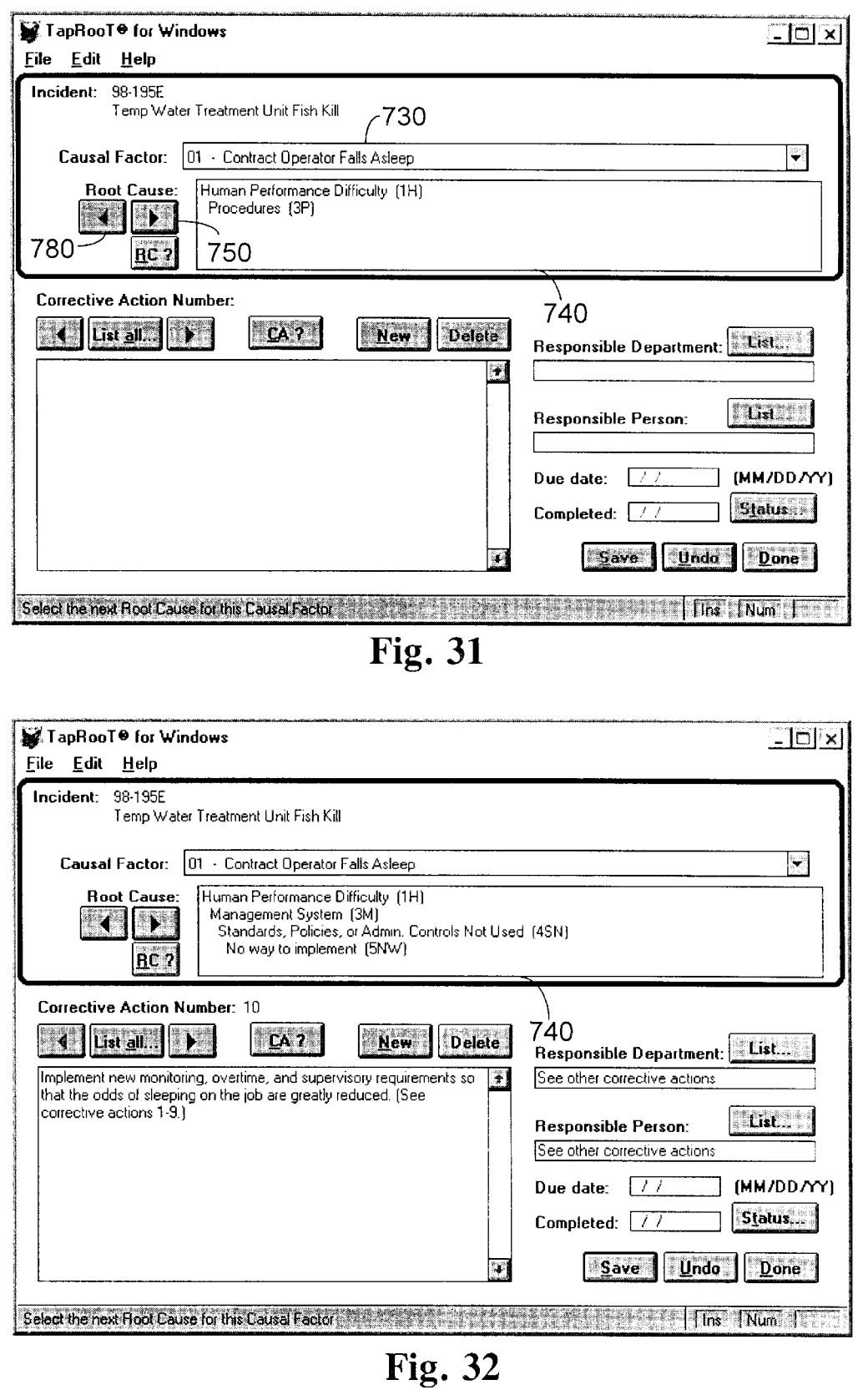

When the user clicks on the Corrective Actions button 330, the processor 20 preferably generates the screen shown in FIG. 31 on the display device 40. This screen summarizes corrective action information pertinent to the causal factor indicated in the Causal Factor drop-down box 730 and pertinent to the root cause indicated in the Root Cause box 740. Since there was no root cause identified under the "Procedures" basic cause category, there is no information listed in any of the other information boxes shown in the screen of FIG. 31.

Figures 33, 34:
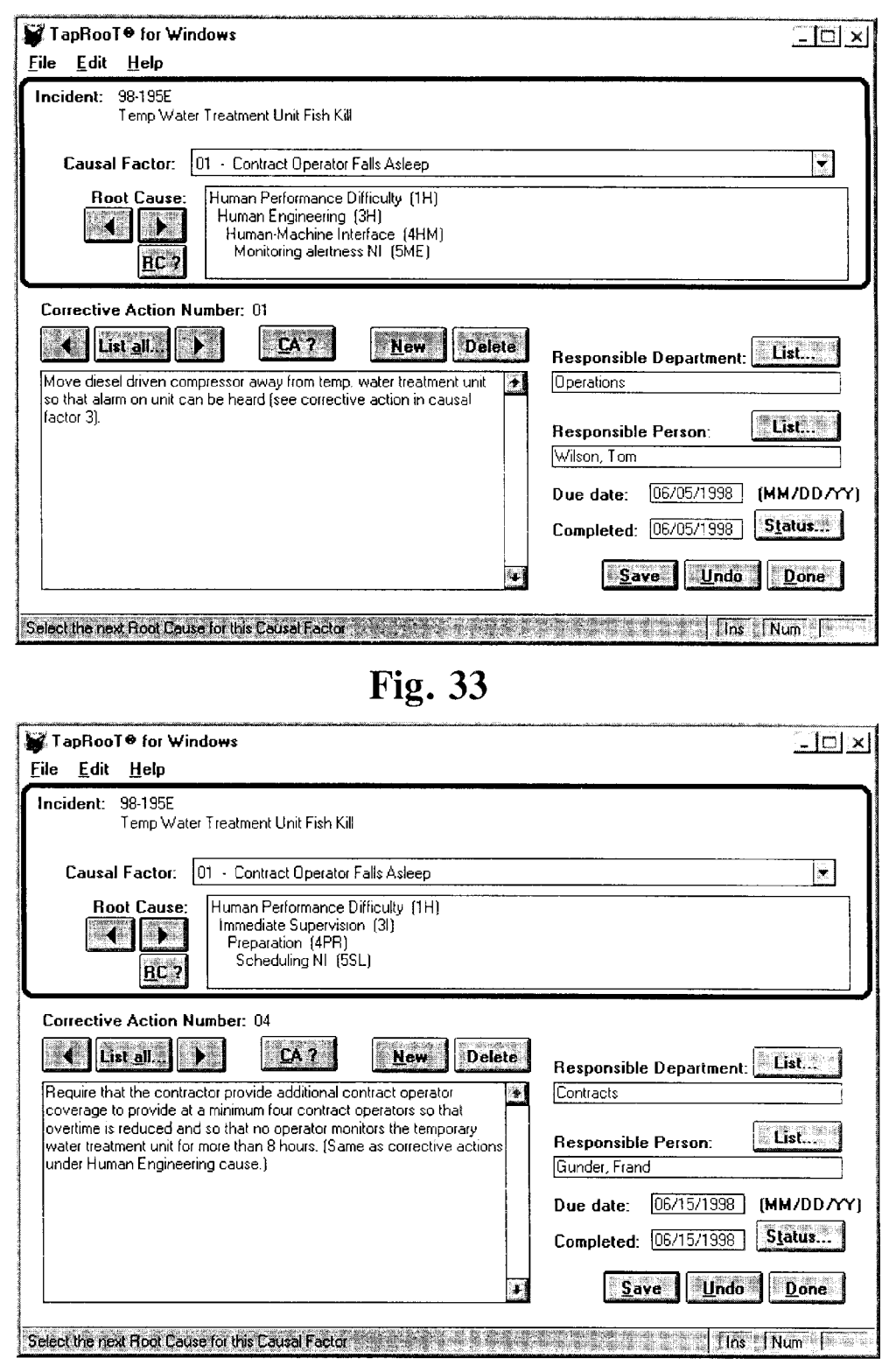

To advance to the next causal factor in the list, the user clicks on the right-arrow button 750 in the screen of FIG. 31. The processor 20 then preferably generates the screen shown in FIG. 32 on the display device 40. This screen summarizes corrective action information pertinent to the root cause indicated in the Root Cause box 740. The Root Cause box 740 shows the root cause analysis path from the highest level (Human Performance Difficulty) to the root cause level (No way to implement). From each of the corrective action summary screens, such as shown in FIGS. 31 and 32, the user views the next or previous corrective action summary screen by pressing the right-arrow button 750 or the left-arrow button 780, respectively. The remaining corrective action summary screens for the current example are shown in FIGS. 33–35.

Figure 35:
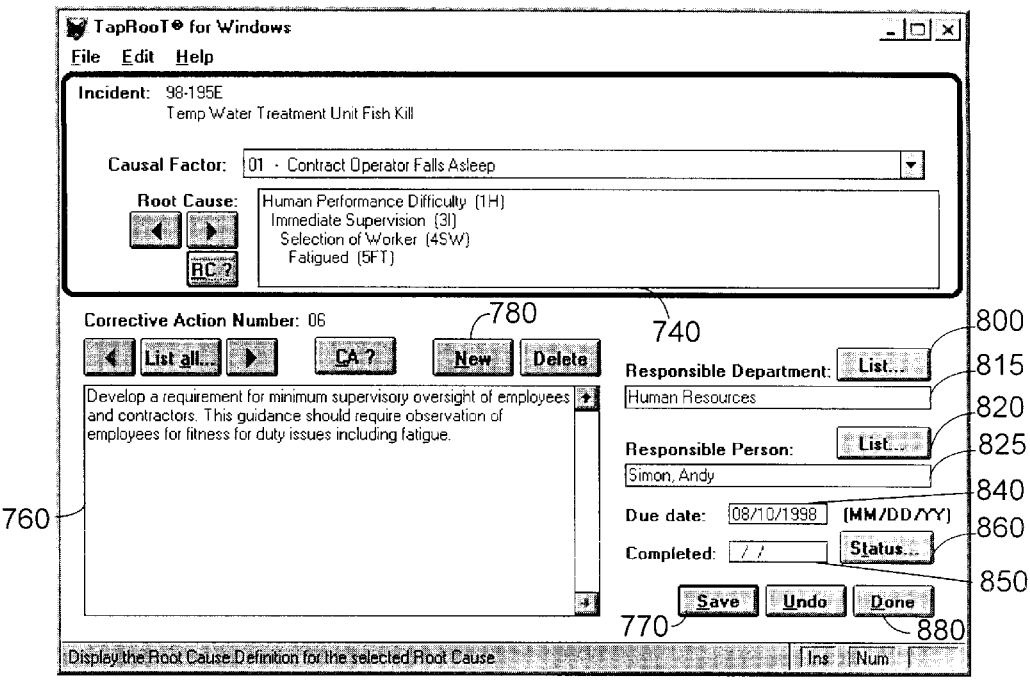

With reference now to FIG. 35, on the bottom left of the screen is a corrective action summary box 760 for the corrective action associated with the root cause indicated in the Root Cause box 740. The user enters text in the box 760 to describe any planned corrective action to eliminate the root cause. Of course, the user's corrective action plan is likely to be significantly influenced by the suggested corrective actions provided by the Corrective Action Helper™, as shown in FIG. 27. When the user clicks on the Save button 770, the processor 20 stores the information shown in the corrective action summary box 760 in the memory device 30, and associates this information with the particular incident, causal factor, and root cause.

Figure 36:
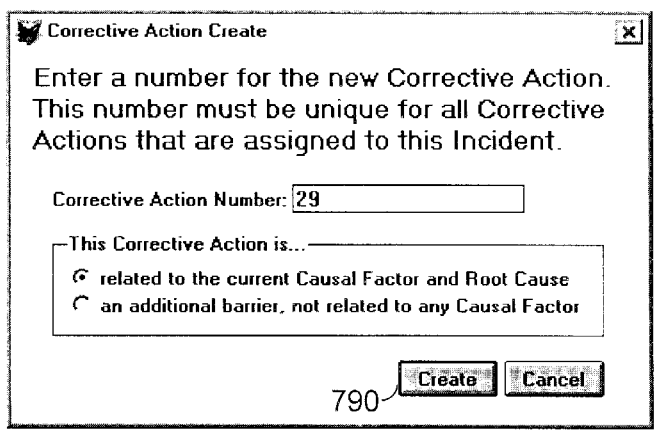
FIG. 36 is an illustration of a Corrective Action Create dialog box generated by a preferred embodiment of the invention.

Should the user wish to create another corrective action for this root cause, the user clicks on the New button 780. When the user clicks on the New button 780, the processor 20 preferably generates the Corrective Action Create box of FIG. 36 on the display device 40. This input box allows the user to enter a corrective action number for the new corrective action (where the next number in the sequence is automatically suggested), and to designate whether the new corrective action will be associated with the current causal factor and root cause. When the user clicks on the Create button 790, the processor 20 preferably generates a new corrective action summary screen on the display device 40 for the new corrective action.

Figure 37:
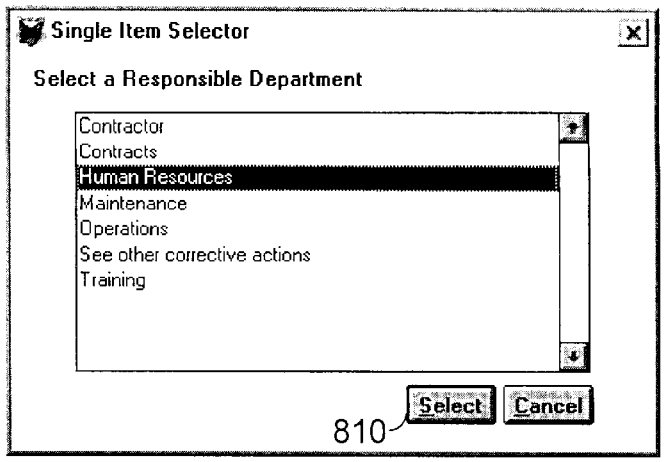
FIGS. 37–38 are illustrations of Single Item Selector dialog boxes generated by a preferred embodiment of the invention.

With continued reference to FIG. 35, the user may designate a department within the user's company that is responsible for implementing the current corrective action. The user may designate a responsible department by typing in the name of a responsible department in the box 815. By doing so, the name of the department typed into the box 815 is also added to a list of departments stored in the memory device 30. Alternatively, the user may press the List button 800, thus causing the processor 20 to generate the single item selector box of FIG. 37. From this box, the user may select a responsible department from the list stored in the memory device 30 by highlighting the department and clicking on the Select button 810.

Figure 38:
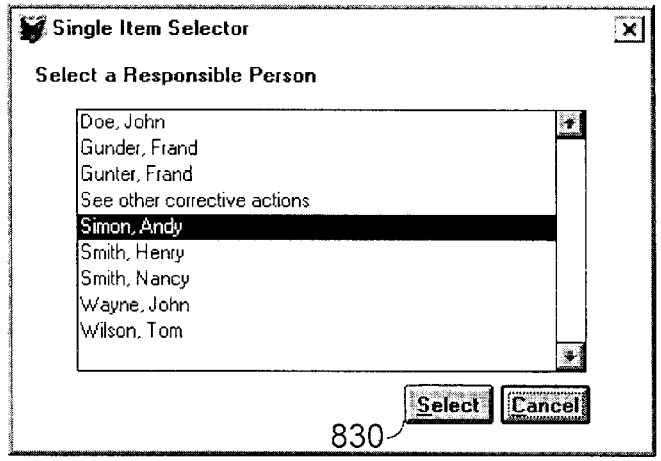

The user may also designate a person within the responsible department that will be personally responsible for implementing the current corrective action. The user designates a responsible person by typing in the name of the person in the box 825. By doing so, the name of the person typed into the box 825 is also added to a list of persons stored in the memory device 30. Alternatively, the user may press the List button 820, thereby causing the processor 20 to generate the single item selector box of FIG. 38. From this box, the user may select the responsible person from the list stored in the memory device 30 by highlighting the person's name and clicking on the Select button 830.

Also shown in the screen of FIG. 35 are date entry boxes 840 and 850 where the user enters the due date for completing implementation of the current corrective action, and the actual completion date.

Figure 39:
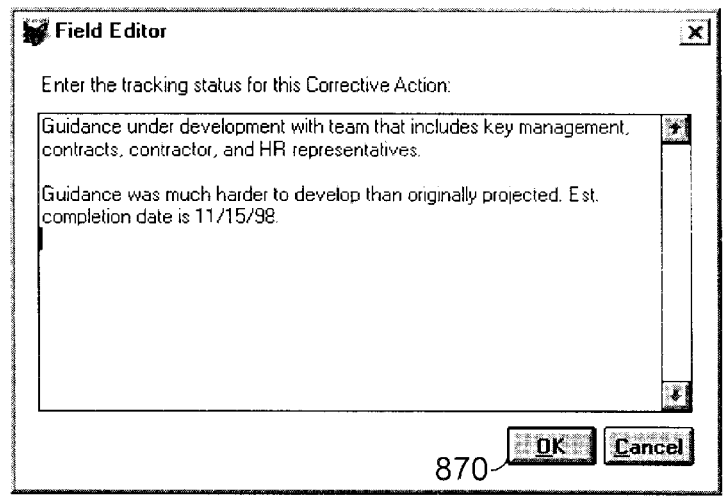
FIG. 39 is an illustration of a Field Editor dialog box generated by a preferred embodiment of the invention.

Should the user wish to view or update the status of implementation of a particular corrective action, the user clicks on the Status button 860 which preferably causes the processor 20 to activate the Field Editor shown in FIG. 39. Here, the user enters text describing the current status of the implementation of the current corrective action. When the user clicks on the OK button 870 of FIG. 39, the processor 20 stores the text field in the memory device 30, and associates this field with the current corrective action.

When the user finishes entering information pertinent to the current corrective action, the user clicks on the Save button 770 in the screen of FIG. 35 to save the newly-entered information. When the user clicks on the Save button 770, the processor 20 preferably stores the contents of all of the data entry fields in the memory device 30, and associates these fields with the current corrective action as designated by its corrective action number. When the user clicks on the Done button 880, the processor 20 again generates the Main screen on the display device 40, as shown in FIG. 3.

Figure 40:
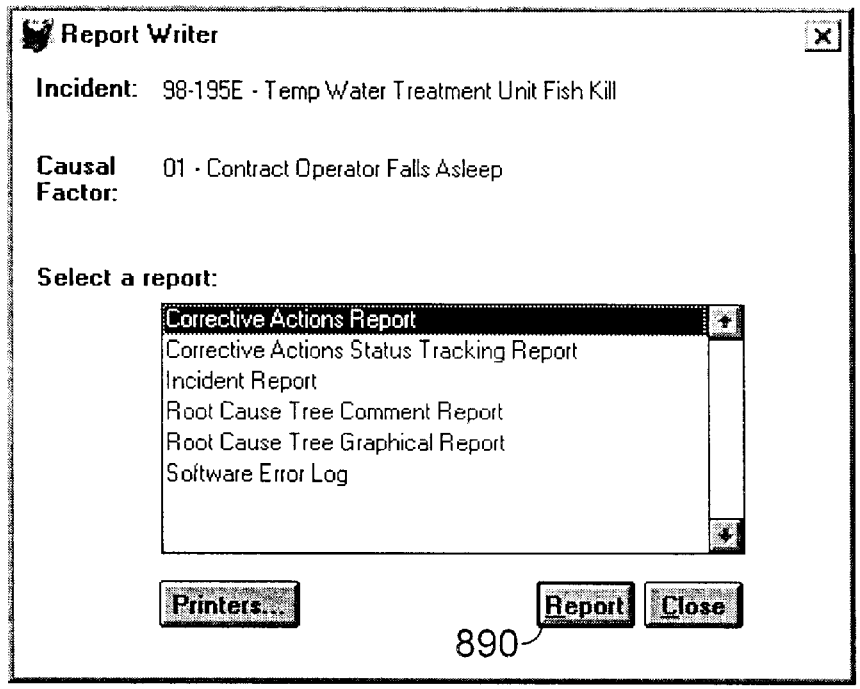
FIG. 40 is an illustration of a Report Writer dialog box generated by a preferred embodiment of the invention.

The preferred embodiment of the invention also provides reports that summarize facts relating to a particular incident, that detail the root cause analysis, and that detail the corrective actions. To generate a report, the user clicks on the Reports button 340 shown in FIG. 3. When the user clicks on the Reports button 340, the processor generates a report selection box on the display 40 as shown in FIG. 40. From the report selection box, the user may select from five formats of reports: (1) Corrective Actions Report, (2) Corrective Actions Status Tracking Report, (3) Incident Report, (4) Root Cause Tree Comment Report, and (5) Root Cause Tree Graphical Report.

Figure 41:
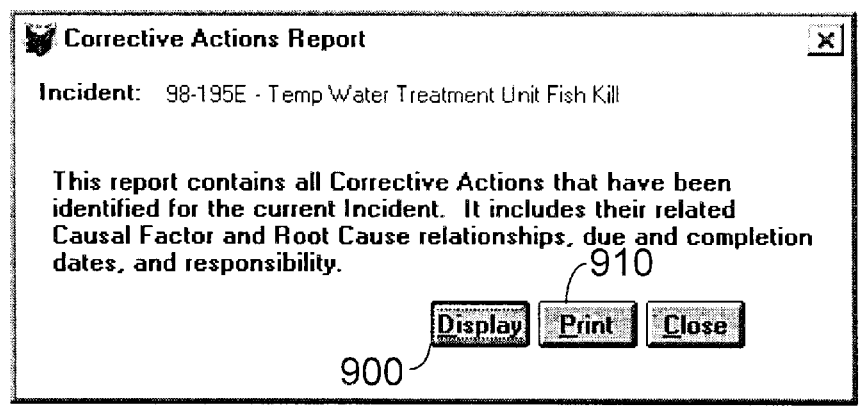
FIG. 41 is an illustration of a Corrective Actions Report dialog box generated by a preferred embodiment of the invention.

When the user highlights the Corrective Actions Report and clicks on the Report button 890, the processor 20 preferably generates the Corrective Actions Report box on the display device 40, as shown in FIG. 41. From this box, the user clicks on the Display button 900 to preview the report on the display device 40, or clicks on the Print button 910 to send the report to a printer. FIG. 42 depicts an example of the first page of a printed Corrective Actions Report generated by the system for the "fish kill" incident.

Figure 43:
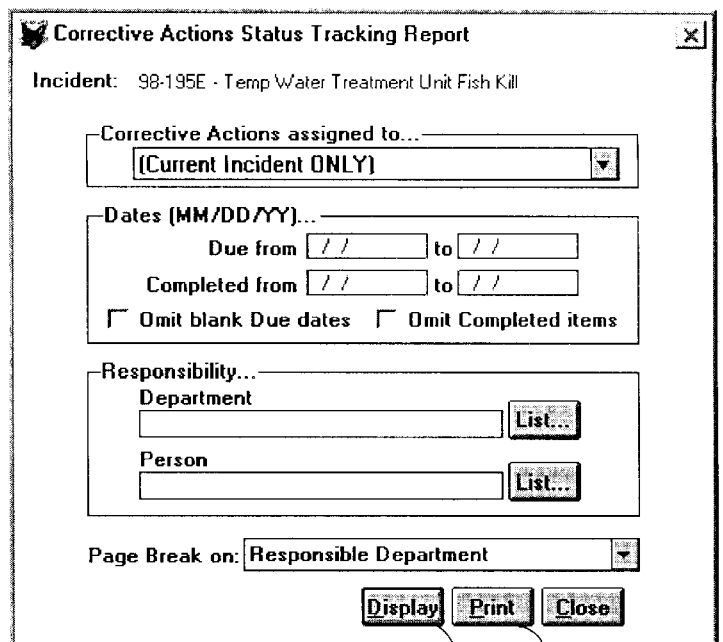
FIG. 43 is an illustration of a Corrective Actions Status Tracking Report dialog box generated by a preferred embodiment of the invention.

With reference to FIG. 40, when the user highlights the Corrective Actions Status Tracking Report and clicks on the Report button 890, the processor 20 generates the Corrective Actions Status Tracking Report box on the display device 40, as shown in FIG. 43. Using this box, the user has the option of narrowing the scope of the report by selecting date ranges, responsible departments, and responsible persons. From this box, the user also has the option of clicking on the Display button 920 to preview the report on the display device 40, or clicking on the Print button 930 to send the report to a printer.

FIG. 44 shows an example of the first page of a printed Corrective Actions Status Tracking Report generated by the system for the "fish kill" incident. This report is preferably presented in a tabular format with columns for the incident, the corrective action, the status of the corrective action, the due date for completing the corrective action, and the actual completion date. The report also identifies the department and person responsible for implementing the corrective action plan associated with each corrective action. This report provides a clear and concise summary of the status of implementation of each corrective action identified to prevent recurrence of the incident.

Figure 45:
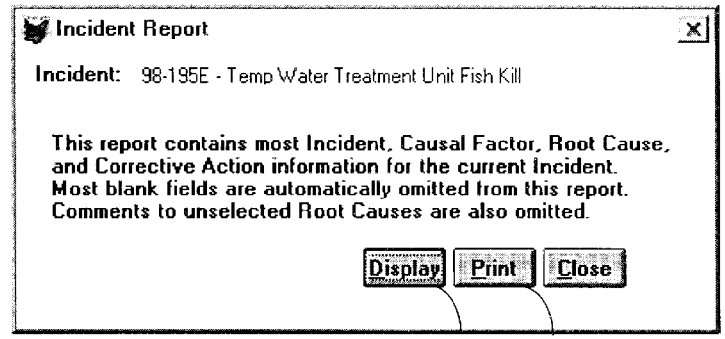
FIG. 45 is an illustration of an Incident Report dialog box generated by a preferred embodiment of the invention.

Again referring to FIG. 40, when the user highlights the Incident Report and clicks on the Report button 890, the processor 20 generates the Incident Report box on the display device 40, as shown in FIG. 45. From this box, the user has the option of clicking on the Display button 940 to preview the report on the display device 40, or clicking on the Print button 950 to send the report to a printer. FIGS. 46 and 47 show examples of the first two pages of a printed Incident Report generated by the system for the "fish kill" incident.

Figure 48:
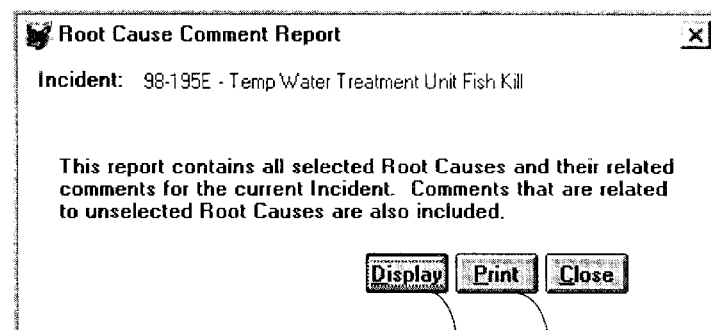
FIG. 48 is an illustration of a Root Cause Comment Report dialog box generated by a preferred embodiment of the invention.

Referring again to FIG. 40, when the user highlights the Root Cause Comment Report and clicks on the Report button 890, the processor 20 generates the Root Cause Comment Report box on the display device 40, as shown in FIG. 48. From this box, the user has the option of clicking on the Display button 960 to preview the report on the display device 40, or clicking on the Print button 970 to send the report to a printer. FIG. 49 shows an example of the first page of a printed Root Cause Comment Report generated by the system for the "fish kill" incident.

Figure 50:
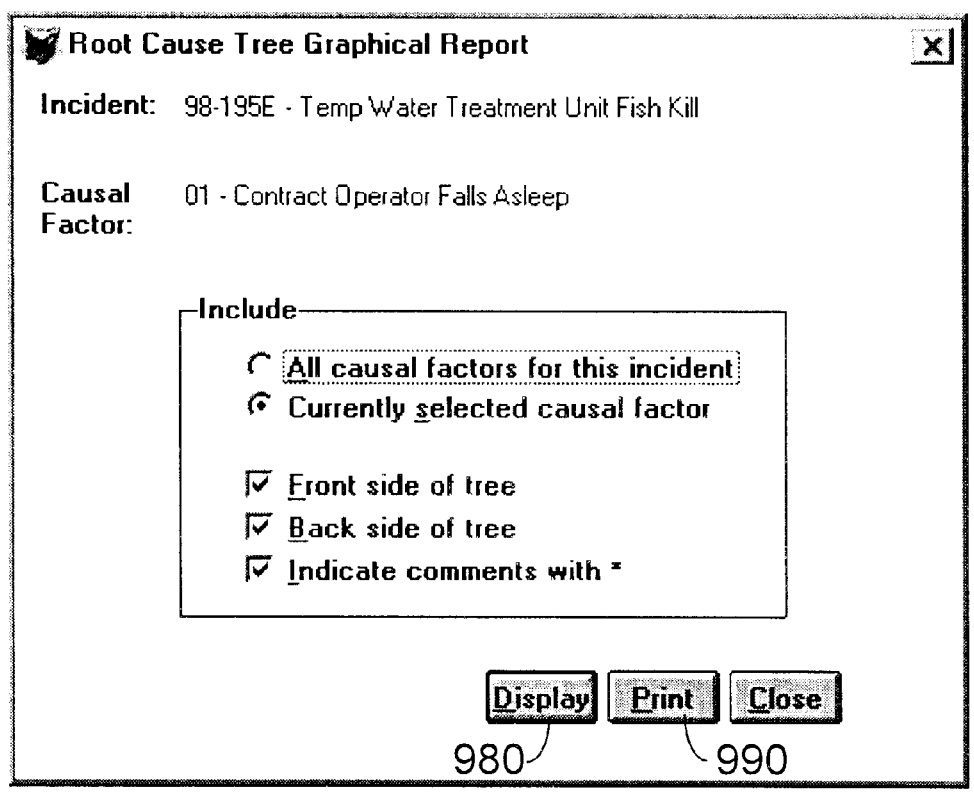
FIG. 50 is an illustration of a Root Cause Tree Graphical Report dialog box generated by a preferred embodiment of the invention.
Figure 51:
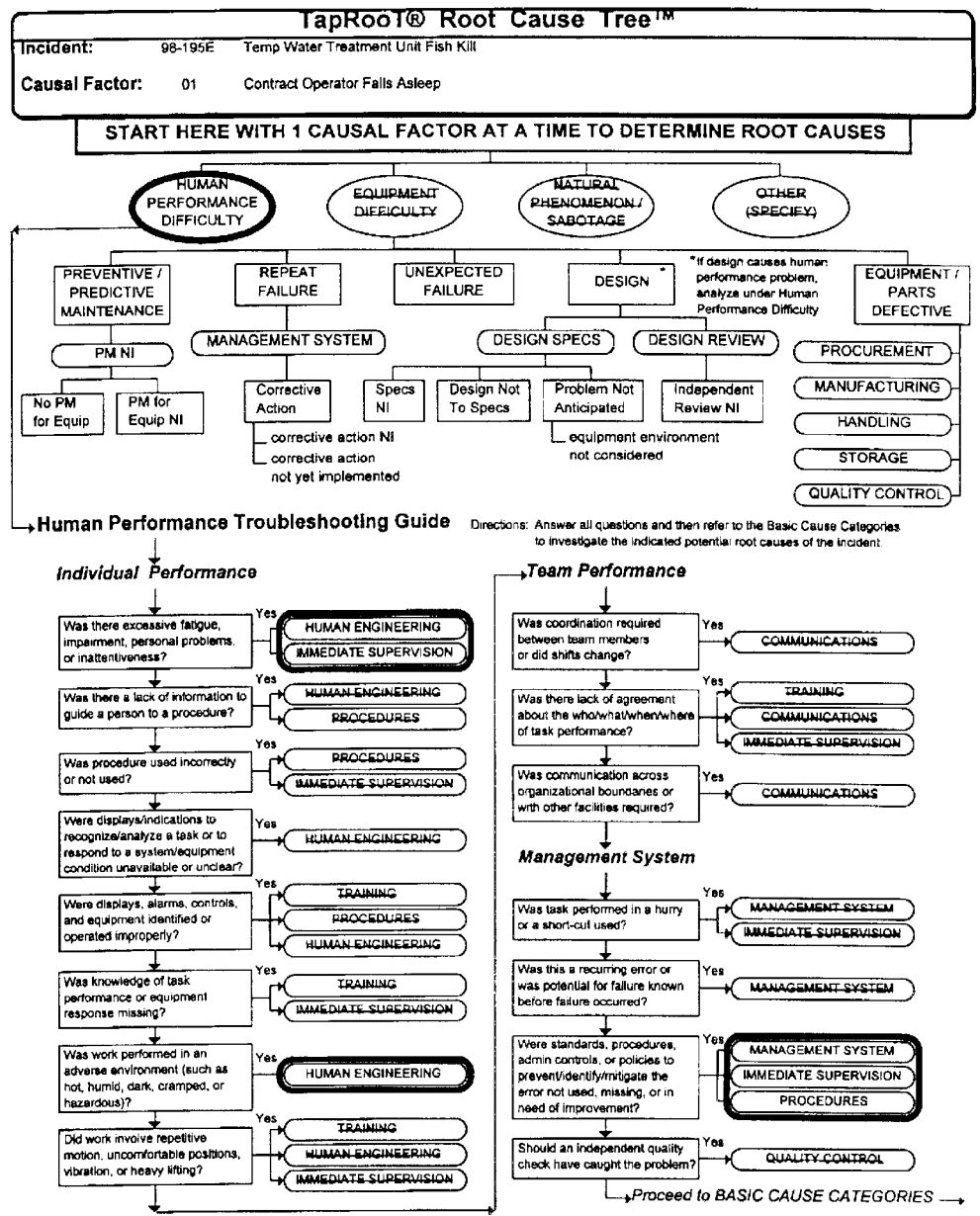
FIGS. 51–52 are illustrations of Root Cause Tree Graphical Report pages generated by a preferred embodiment of the invention.
Figure 52:
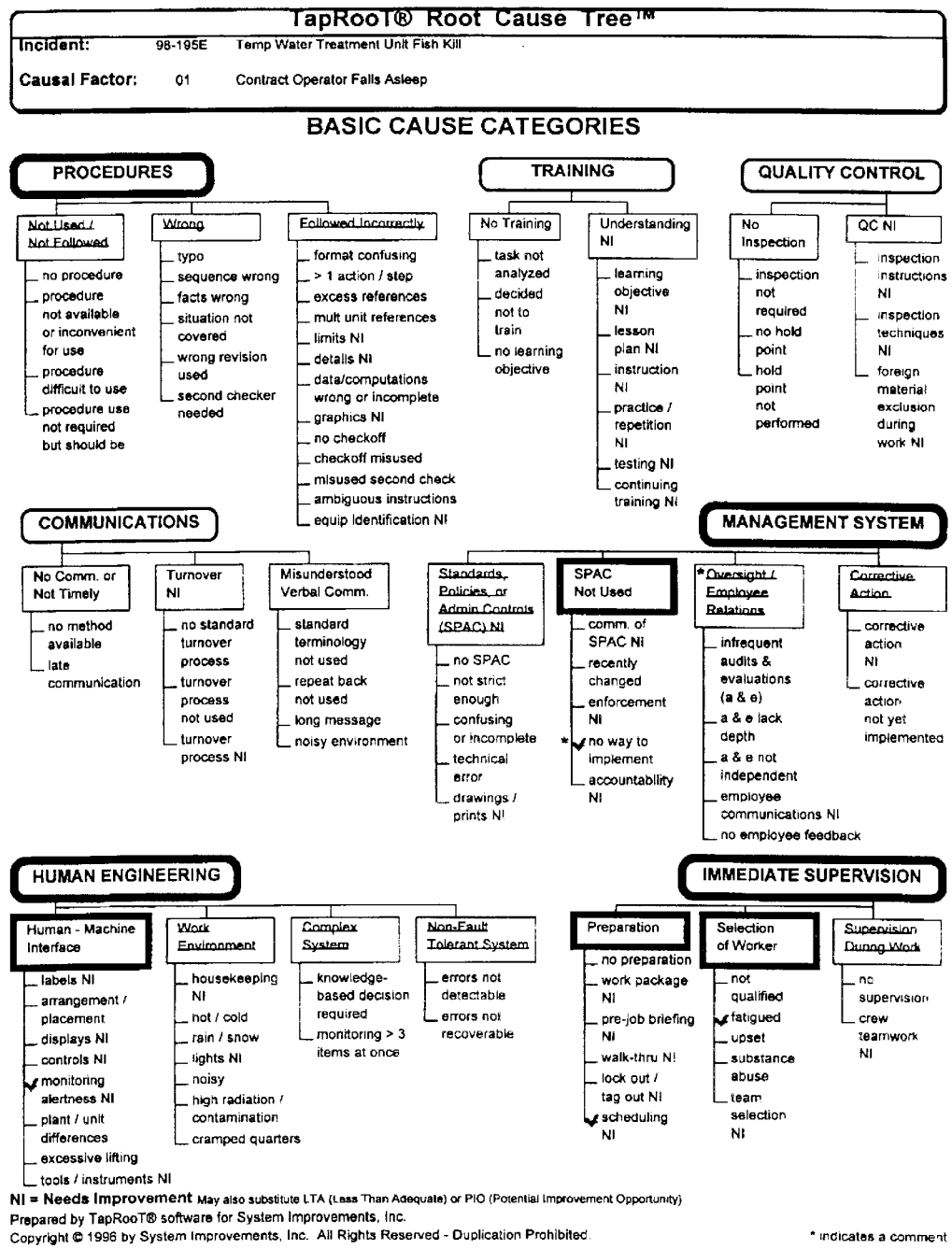

When the user highlights the Root Cause Tree Graphical Report on the screen of FIG. 40 and clicks on the Report button 890, the processor 20 generates the Root Cause Tree Graphical Report box on the display device 40, as shown in FIG. 50. From this box, the user has the option of clicking on the Display button 980 to preview the report on the display device 40, or clicking on the Print button 990 to send the report to a printer. FIGS. 51 and 52 show an example of a printed Root Cause Tree Graphical Report generated by the system for the "fish kill" incident.

As described above, the invention includes powerful features for determining root causes of incidents and suggesting corrective actions for root causes that are related to human performance difficulties. However, for causal factors that are equipment-related, the invention also analyzes and suggests corrective action for root causes that are related to equipment difficulties. To illustrate the functioning of the system in analyzing equipment-related root causes, another causal factor analysis related to the "fish kill" incident will be described.

Figure 53:
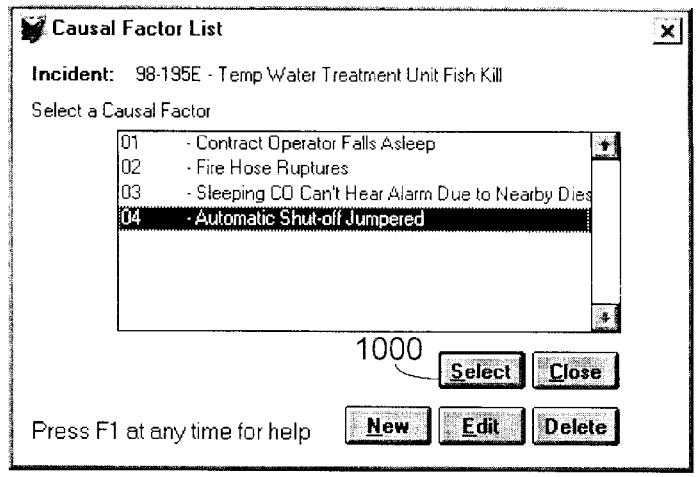
FIG. 53 is an illustration of a Causal Factor List dialog box generated by a preferred embodiment of the invention.
Figure 54:
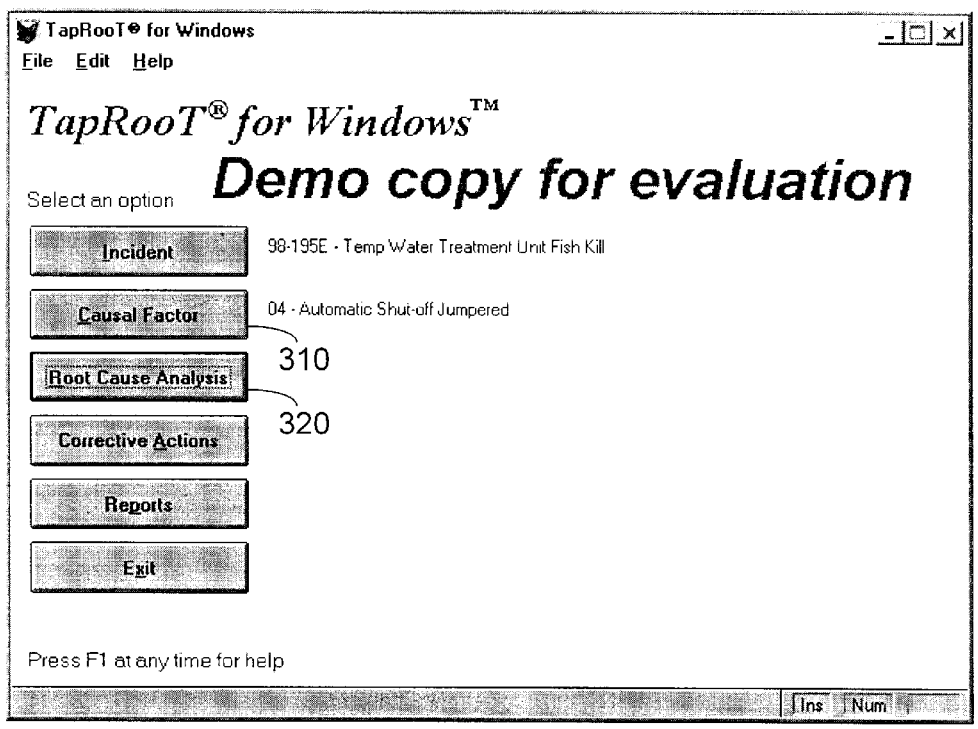
FIG. 54 is an illustration of a main screen generated by a preferred embodiment of the invention.

Shown in FIG. 53 is the Causal Factor List display screen. As discussed above, this screen displays the list of causal factors that have been previously entered by the user. When the user highlights the causal factor "Automatic Shut-off Jumpered" and clicks on the Select button 1000, the processor 20 generates the Main screen as shown in FIG. 54 on the display device 40. Note that the new causal factor is now indicated next to the Causal Factor button 310.

Figure 55:
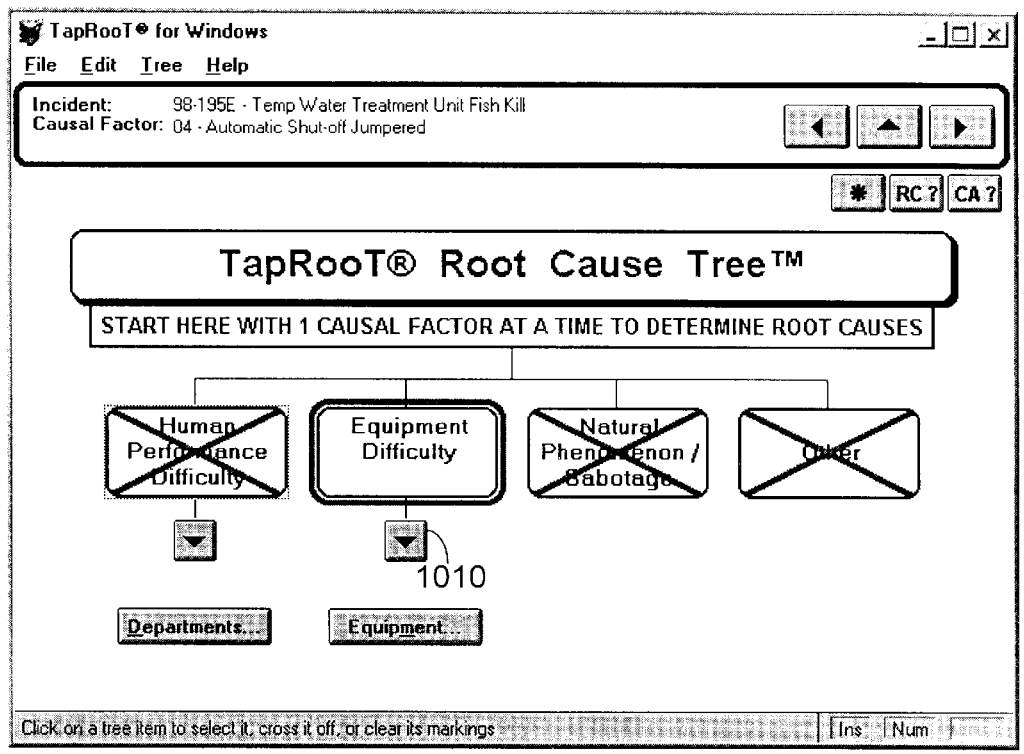
FIG. 55 is an illustration of a Difficulty level screen generated by a preferred embodiment of the invention.

When the user clicks on the Root Cause Analysis button 320, the processor 20 preferably generates the Difficulty level screen as shown in FIG. 55 on the display device 40. Here, since the causal factor is equipment-related, the user highlights the "Equipment Difficulty" category and crosses out the other categories at this level. To advance to the next level in the analysis, the user clicks on the down-arrow button 1010.

Figure 56:
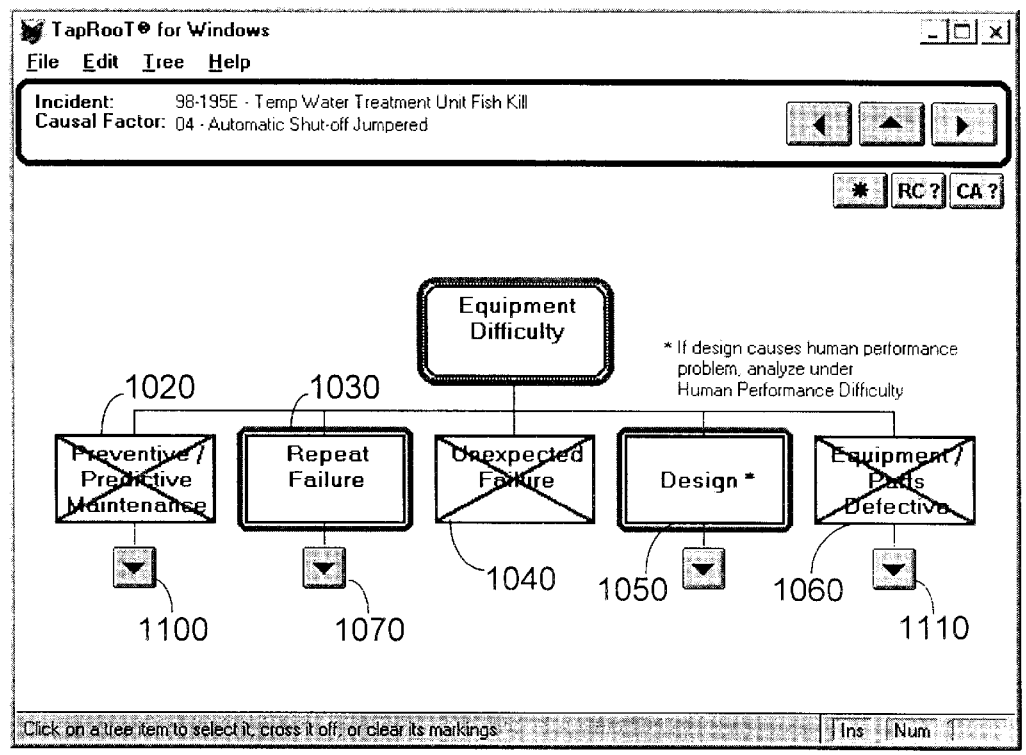
FIG. 56 is an illustration of a screen showing basic cause categories beneath the Difficulty category generated by a preferred embodiment of the invention.

When the user clicks on the down-arrow button 1010, the processor 20 generates the Basic Cause level screen of FIG. 56 on the display device 40. As FIG. 56 indicates, the basic cause categories under the equipment difficulty category are represented by a "Preventive/Predictive Maintenance" block 1020, a "Repeat Failure" block 1030, an "Unexpected Failure" block 1040, a "Design" block 1050, and an "Equipment/Parts Defective" block 1060.

For the current incident example, if the user knows that a similar water hose has failed previously, the user clicks on the down-arrow button 1070 beneath the "Repeat Failure" block 1030. The processor 20 then generates the screen shown in FIG. 57 on the display device 40. This screen illustrates the analysis levels and categories in the causal information database that fall under the "Repeat Failure" basic cause category.

Figure 57:
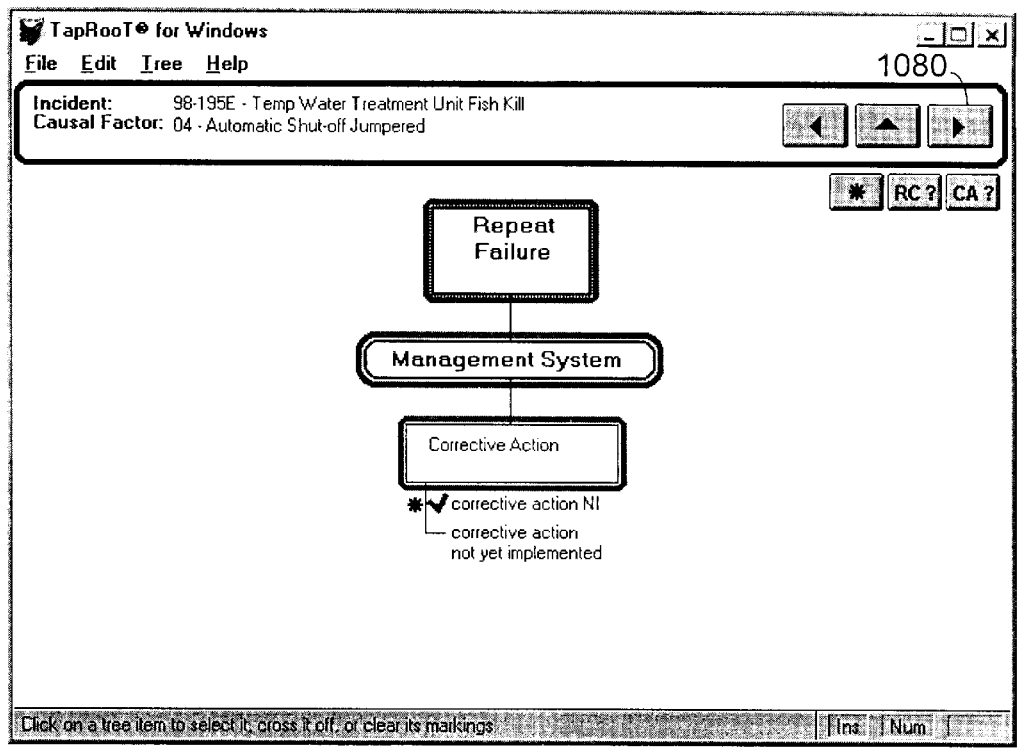
FIG. 57 is an illustration of a screen showing the causal categories under the Repeat Failure category generated by a preferred embodiment of the invention.

By clicking on the right-arrow button 1080 in the screen of FIG. 57, the user causes the processor 20 to advance to the next relevant basic cause category at the Basic Cause level of analysis. When the user does so, the processor 20 generates the screen shown in FIG. 58 on the display device 40. This screen illustrates the analysis levels and categories in the causal information database that fall under the "Design" basic cause category.

Figure 58:
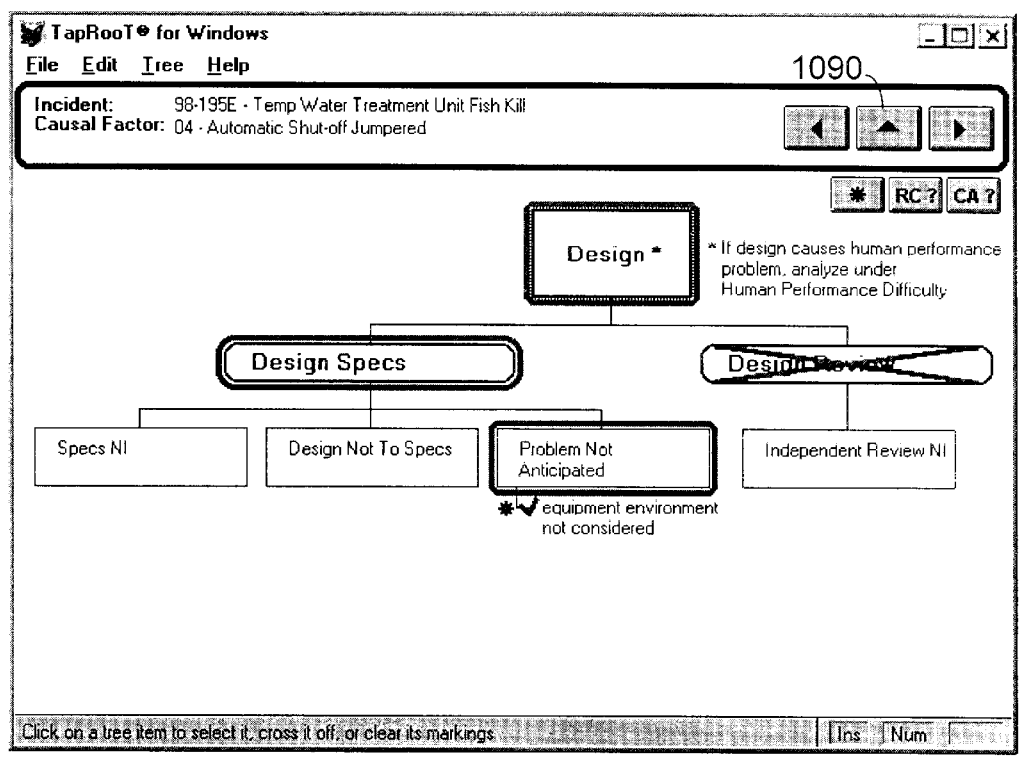
FIG. 58 is an illustration of a screen showing the causal categories under the Design category generated by a preferred embodiment of the invention.
Figure 59:
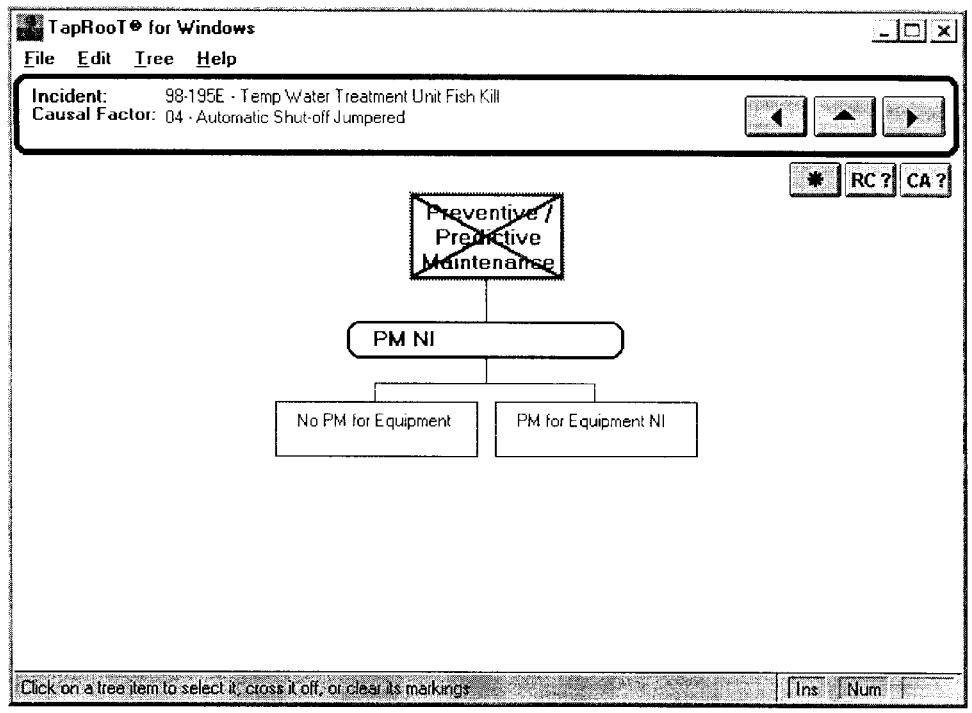
FIG. 59 is an illustration of a screen showing the causal categories under the Preventive/Predictive Maintenance category generated by a preferred embodiment of the invention.

When the user clicks on the up-arrow button 1090 in the screen of FIG. 58, the processor 20 returns to the screen of FIG. 56. From that point, the analysis is directed to the "Preventive/Predictive Maintenance" category when the user clicks on the down-arrow button 1100 beneath the block 1020. When the user does so, the processor 20 preferably generates the screen shown in FIG. 59. Referring again to FIG. 56, when the user clicks on the down-arrow button 1110 beneath the "Equipment/Parts Defective" block 1060, the processor 20 generates the screen shown in FIG. 60.

Figure 61:
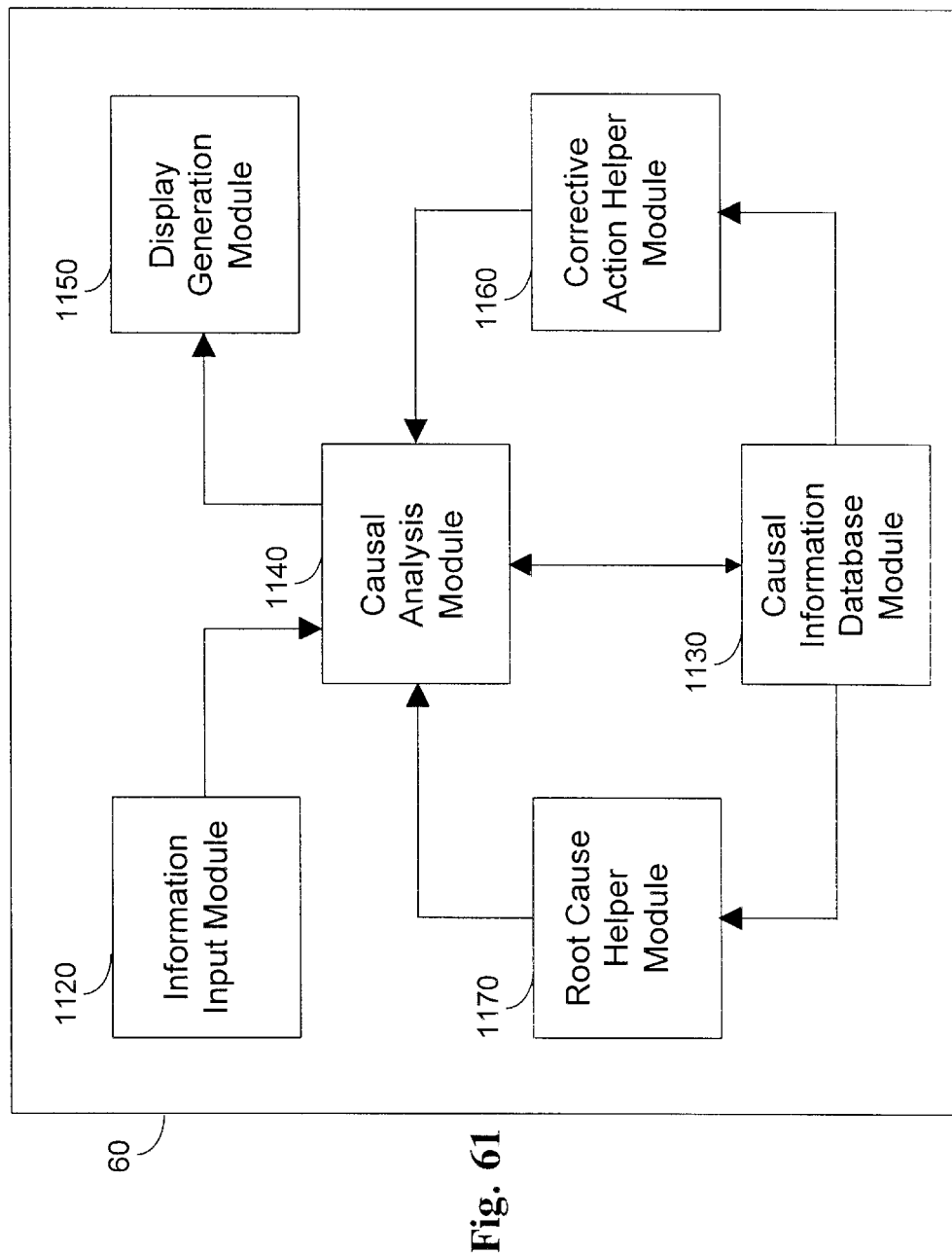
FIG. 61 is a functional block diagram of a computer-readable information storage device according to a preferred embodiment of the invention.

Shown in FIG. 61 is a functional block diagram of the information storage device 60. As discussed previously, the information storage device 60 is a storage medium, such as a magnetic floppy disk or optical compact disc (CD), that stores executable software modules, relational databases, and other digital information that comprise the system software. Preferably, the processor 20 accesses the software modules on the information storage device 60 by way of the information retrieval device 50, and loads the modules into the memory device 30. The processor 20 then accesses the modules from the memory device 30 to execute functions of the system as described above. Alternatively, the processor 20 may access and execute the modules directly from the information storage device 60.

In a preferred embodiment, the information storage device 60 includes an information input module 1120 that contains instructions executed by the processor 20 for receiving incident information from the information input device 10. By executing the information input module 1120, the processor 20 interprets input from the information input device 10, such as input generated by a mouse as the user clicks on a button on a display screen.

The information storage device 60 also includes a causal information database module 1130. The causal information database module 1130 stores the causal information database in a digital format that may be accessed by the processor 20. As described above, the causal information database provides the relationship between the multiple causal analysis levels and causal factor categories.

The information storage device 60 further includes a causal analysis module 1140. The causal analysis module 1140 consists of the instructions executed by the processor 20 to access the causal information database, to determine the root cause of a particular incident, and to determine an appropriate corrective action. These instructions preferably guide the processor 20 in progressing through the multiple causal analysis levels of the causal information database based on incident information provided by the user by way of the information input device 10.

Another component of the information storage device 60 is a corrective action helper module 1160. This module 1160 stores the previously-described Corrective Action Helper™ database in a digital format that may be accessed by the processor 20. As discussed above, the Corrective Action Helper™ is a database of suggested corrective actions that are linked to root causes on the Root Cause level of the causal information database. Through execution of instructions provided by the causal analysis module 1140, the processor 20 determines suggested corrective actions by following the links between the corrective action helper module 1160 and the causal information database module 1130. In the preferred embodiment, the corrective action helper module 1160 is a Windows help file.

The information storage device 60 also includes a root cause helper module 1170. This module 1170 stores the previously-described root cause helper database in a digital format that may be accessed by the processor 20. The root cause helper is a database of messages that guide the user in selecting a root cause. As discussed above, the root cause helper database links these messages to root causes on the Root Cause level of the causal information database. Through execution of instructions provided by the causal analysis module 1140, the processor 20 accesses the messages in the root cause helper database by following the links between the root cause helper module 1170 and the causal information database module 1160. In the preferred embodiment, the root cause helper module 1170 is also a Windows help file.

In a preferred embodiment of the invention, the information storage device 60 includes a display generation module 1150. This module 1150 contains instructions executed by the processor 20 for generating graphic representations on the display device 40, such as the display screens described previously.

It is contemplated, and will be apparent to those skilled in the art from the preceding description and the accompanying drawings that modifications and/or changes may be made in the embodiments of the invention. For example, the titles given herein for the various cause levels and categories in the causal information database are exemplary, and indicate one preferred embodiment of the invention. It should be appreciated that other causal levels could be implemented, and that other categories could exist within each level. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A computer-implemented system for determining, by logical progression through multiple analysis levels, a human factor that represents a root cause of a particular incident, the system beginning at a broad analysis level and progressing through more narrow analysis levels to a root cause level, where each analysis level includes multiple causal factor categories, and where a causal factor category branches into causal factor subcategories that reside on a more narrow analysis level, the system comprising:
   (a) an information input device for inputting incident information relating to the particular incident and for converting the incident information into a system-compatible format;
   (b) a memory device for storing a causal information database that provides a relationship between the multiple analysis levels and causal factor categories and between causal factor categories and root causes, and that relates root causes to corrective actions that may be implemented to prevent future occurrences of the incidents, the causal information database including a difficulties level having a natural phenomenon/sabotage category;
   (c) a processor connected to the information input device and to the memory device, the processor for accessing the causal information database and determining a human factor that represents a root cause of the particular incident by logically progressing through the multiple analysis levels based upon the incident information from the information input device, the processor logically progressing through the multiple analysis levels by selecting, based upon the incident information, an appropriate causal factor category at each analysis level, the processor for accessing the causal information database and determining at least one corrective action that may be implemented to prevent future occurrences of the particular incident based on the root cause of the particular incident;
   (d) a display device connected to the processor for displaying a graphic representation of the multiple analysis levels, where the graphic representation indicates the causal factor categories selected by the processor in determining the root cause of the particular incident, and for displaying the at least one corrective action that may be implemented to prevent future occurrences of the particular incident.

2. The system of claim 1 further comprising the memory device for storing a corrective action database that provides a relationship between root causes and corrective actions that may be implemented to prevent future occurrences of the particular incident.

3. The system of claim 1 further comprising the memory device for storing the causal information database that includes a basic cause level, a near root cause level, and the root cause level, where the causal factor categories on the difficulties level branch into causal factor subcategories that reside in the basic cause level, where the causal factor categories on the basic cause level branch into causal factor subcategories that reside in the near root cause level, and where the causal factor categories on the near root cause level branch into causal factor subcategories that reside in the root cause level.

4. The system of claim 1 further comprising the memory device for storing the causal information database that includes the difficulties level having a human performance difficulty category and an equipment difficulty category.

5. A computer-readable information storage device comprising computer-executable modules for implementing a system for determining, by logical progression through multiple analysis levels, a human factor that represents a root cause of a particular incident, the system beginning at a broad analysis level and progressing through more narrow analysis levels to a root cause level, where each analysis level includes multiple causal factor categories, and where each causal factor category branches into causal factor subcategories that reside on a more narrow analysis level, the information storage device comprising:
   (a) an information input module for receiving incident information relating to the particular incident and for converting the incident information into a system-compatible format;
   (b) a causal information database module for storing a causal information database that provides a relationship between the multiple analysis levels and causal factor categories and between causal factor categories and root causes, the causal information database including a difficulties level having a natural phenomenon/sabotage category;
   (c) a corrective action database module for storing a corrective action database that relates root causes to corrective actions that may be implemented to prevent future occurrences of the incidents;
   (d) a causal analysis module for accessing the causal information database and determining a human factor that represents a root cause of the particular incident by logically progressing through the multiple analysis levels based upon the incident information, the causal analysis module logically progressing through the multiple analysis levels by selecting, based upon the incident information, an appropriate causal factor category at each analysis level, and the causal analysis module for accessing the corrective action database and determining at least one corrective action that may be implemented to prevent future occurrences of the particular incident based on the root cause of the particular incident; and
   (e) a display generation module for generating a graphic representation of the multiple analysis levels, where the graphic representation indicates the causal factor categories selected by the causal analysis module in determining a root cause of the particular incident, and indicates the at least one corrective action that may be taken to prevent future occurrences of the particular incident.

6. The computer-readable information storage device of claim 5 wherein the information input module, the causal information database module, the corrective action database module, the causal analysis module, and the display generation module comprise a unitary computer-executable program.

7. A computer-implemented system for determining, by logical progression through multiple analysis levels, a human factor that represents a root cause of a particular incident, the system beginning at a broad analysis level and progressing through more narrow analysis levels to a root cause level, where each analysis level includes multiple causal factor categories, and where each causal factor category branches into causal factor subcategories that reside on a more narrow analysis level, the system comprising the following steps:

(a) generating a causal information database that provides a relationship between the multiple analysis levels and causal factor categories and between causal factor categories and root causes, and that relates root causes to corrective actions that may be implemented to prevent future occurrences of the incidents, the causal information database including a difficulties level having a natural phenomenon/sabotage category;

(b) inputting incident information relating to the particular incident;

(c) accessing the causal information database to determine a human factor that represents a root cause of the particular incident by logically progressing, based upon the incident information, through the multiple analysis levels by selecting an appropriate causal factor category at each analysis level;

(d) determining at least one corrective action that may be implemented to prevent future occurrences of the particular incident based on the root cause of the particular incident;

(e) displaying a graphic representation of the multiple analysis levels, where the graphic representation indicates causal factor categories selected in determining the root cause of the particular incident; and (f) displaying the at least one corrective action that may be implemented to prevent future occurrences of the particular incident.

8. The system of claim 7 further comprising:

(a) generating a corrective action database that relates root causes to corrective actions that may be implemented to prevent future occurrences of the incidents; and (b) the determining step further comprising accessing the corrective action database to determine at least one corrective action that may be implemented to prevent future occurrences of the particular incident based on the root cause of the particular incident.

9. The system of claim 7 further comprising generating the causal information database to include, a basic cause level, a near root cause level, and the root cause level, where the causal factor categories on the difficulties level branch into causal factor subcategories that reside in the basic cause level, where the causal factor categories on the basic cause level branch into causal factor subcategories that reside in the near root cause level, and where the causal factor categories on the near root cause level branch into causal factor subcategories that reside in the root cause level.

10. The system of claim 5 further comprising generating the causal information database to include the difficulties level having a human performance difficulty category and an equipment difficulty category.

\* \* \* \* \*